US012565307B2

(12) United States Patent (10) Patent No.: US 12,565,307 B2
Murayama et al. (45) Date of Patent: Mar. 3, 2026

(54) LEADING-EDGE HIGH-LIFT DEVICE, WING, AIRCRAFT, AND BUFFERING MEMBER

(71) Applicants: JAPAN AEROSPACE EXPLORATION AGENCY, Tokyo (JP); KAWASAKI JUKOGYO KABUSHIKI KAISHA, Hyogo (JP); MITSUBISHI HEAVY INDUSTRIES, LTD., Tokyo (JP)

(72) Inventors: Mitsuhiro Murayama, Tokyo (JP); Tohru Hirai, Tokyo (JP); Kazuomi Yamamoto, Tokyo (JP); Masataka Kohzai, Tokyo (JP); Yosuke Ueno, Hyogo (JP); Kazuhide Isotani, Hyogo (JP); Kenji Hayama, Hyogo (JP); Kensuke Hayashi, Tokyo (JP)

(73) Assignees: JAPAN AEROSPACE EXPLORATION AGENCY, Tokyo (JP); KAWASAKI JUKOGYO KABUSHIKI KAISHA, Hyogo (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 18 days.

(21) Appl. No.: 18/564,445

(22) PCT Filed: Mar. 31, 2022

(86) PCT No.: PCT/JP2022/016748
§ 371 (c)(1),
(2) Date: Nov. 27, 2023

(87) PCT Pub. No.: WO2022/249758
PCT Pub. Date: Dec. 1, 2022

(65) Prior Publication Data
US 2024/0253769 A1 Aug. 1, 2024

(30) Foreign Application Priority Data

May 28, 2021 (JP) ................................. 2021-089757

(51) Int. Cl.
*B64C 9/24* (2006.01)
(52) U.S. Cl.
CPC ..................................... *B64C 9/24* (2013.01)
(58) Field of Classification Search
CPC .. B64C 9/24; B64C 9/18; B64C 3/187; B64C 21/02; B64C 21/10
See application file for complete search history.

(56) References Cited

U.S. PATENT DOCUMENTS 6,454,219 B1 9/2002 Moe
6,457,680 B1 10/2002 Dobrzynski et al.
(Continued)

FOREIGN PATENT DOCUMENTS

JP 2009-6987 A 1/2009
JP 2011-162154 A 8/2011
JP 2017-24469 A 2/2017

OTHER PUBLICATIONS

International Search Report dated May 31, 2022 in International Application No. PCT/JP2022/016748.

*Primary Examiner* — Ashesh Dangol
(74) *Attorney, Agent, or Firm* — SALIWANCHIK, LLOYD & EISENSCHENK

(57) ABSTRACT

A leading-edge high-lift device is deployable and retractable from/into a fixed leading edge of a main wing of an aircraft and includes a slat main body and a buffering portion. The slat main body includes a leading edge portion, a trailing edge portion, a cusp portion formed at a lower edge of the leading edge portion, a cove portion formed between the cusp portion and the trailing edge portion, and an inboard end surface that is formed between the leading edge portion (Continued)

and the cove portion and is positioned on a fuselage side of the aircraft. The buffering portion is provided at an inboard end portion of the slat main body including the inboard end surface and an inboard-side surface of the cove portion and reduces pressure fluctuations in airflow on the inboard end surface or the inboard-side surface of the cove portion.

5 Claims, 17 Drawing Sheets

(56)                   References Cited

U.S. PATENT DOCUMENTS

| 2003/0226936 | A1 | 12/2003 | Mau et al. | |
| 2010/0084508 | A1 | 4/2010 | Hirai et al. | |
| 2012/0097791 | A1* | 4/2012 | Turner | B64C 9/24 |
| | | | | 244/1 N |
| 2012/0286101 | A1 | 11/2012 | Hirai et al. | |
| 2017/0369147 | A1* | 12/2017 | Wong | B64C 1/40 |

* cited by examiner (A)

(B)

(C)

(D)

(E)

LEADING-EDGE HIGH-LIFT DEVICE, WING, AIRCRAFT, AND BUFFERING MEMBER

CROSS-REFERENCE TO RELATED APPLICATIONS

This application is the U.S. national stage application of International Patent Application No. PCT/JP2022/016748, filed Mar. 31, 2022, which claims the benefit under 35 U.S.C. § 119 of Japanese Application No. 2021-089757, filed May 28, 2021, the disclosures of each of which are incorporated herein by reference in their entirety.

TECHNICAL FIELD

The present invention relates to a leading-edge high-lift device mounted on an aircraft's wing and to a wing and an aircraft, each including the same.

BACKGROUND ART

High-lift devices are deployed from an aircraft wing in order to perform low-speed flight when an aircraft takes off or lands at an airport. Leading-edge high-lift devices, e.g., slats attached to a fixed leading edge that is a leading edge of a main wing of the aircraft, especially in an airliner for example, generate high lift during low-speed flight.

The slats function to increase the upper limit (maximum lift) of lift of the aircraft wing through gaps formed between the slats and the fixed leading edge. However, they also generate high aerodynamic noise under flight conditions in an approach and landing phase. The noise comes from turbulence in reverse flow regions formed at concaves (coves) formed on lower surfaces of the slats due to a constraint for retracting them in the aircraft wing.

In this context, the concept "cove filler" that adds a curved shape along a shear layer in the reverse flow region to a slat lower surface for avoiding the reverse flow region in the cove is known as a typical technology for reducing noise due to turbulence of the reverse flow region formed in the cove of the slat lower surface (see Patent Literature 1). Moreover, a method of providing a cusp of the slat lower surface where the reverse flow region is generated with a "serration" that actively mixes a shear layer on a cove for inhibiting large pressure fluctuations has been proposed (see Patent Literature 2).

CITATION LIST

Patent Literature

Patent Literature 1: U.S. Pat. No. 6,457,680
Patent Literature 2: Japanese Patent Application Laid-open No. 2011-162154

DISCLOSURE OF INVENTION

Technical Problem

However, it has been found from sound source localization in actual scale or a wind tunnel testing model that loud noise other than noise provided by the turbulence of the shear layer in the cove of the slat lower surface is generated from a slat inboard end portion and a slat supporting mechanism that supports the slat so that the slat can be deployed from the fixed leading edge. The configurations according to Patent Literatures 1 and 2 cannot reduce such noise. Moreover, depending on a frequency band, the noise from the slat inboard end portion and the slat supporting mechanism can be larger than the noise provided by the reverse flow region formed in the cove as described above. Therefore, the noise level as the overall aircraft cannot be lowered unless the noise from the slat inboard end portion and the like can be reduced.

In view of the above-mentioned circumstances, it is an objective of the present invention to provide a technology relating to a leading-edge high-lift device capable of reducing noise generated from a slat inboard end portion and a slat supporting mechanism.

Solution to Problem

A leading-edge high-lift device according to an embodiment of the present invention is a leading-edge high-lift device that is deployable and retractable from/into a fixed leading edge of a main wing of an aircraft and includes a slat main body and a buffering portion.

The slat main body includes a leading edge portion, a trailing edge portion that forms a gap between a trailing edge portion and the main wing during deployment, a cusp portion formed at a lower edge of the leading edge portion, a cove portion formed between the cusp portion and the trailing edge portion, and an inboard end surface that is formed between the leading edge portion and the cove portion and is positioned on a fuselage side of the aircraft.

The buffering portion is provided at an inboard end portion of the slat main body including the inboard end surface and an inboard-side surface of the cove portion and reduces pressure fluctuations in airflow on the inboard end surface or the inboard-side surface of the cove portion.

The buffering portion may be a structure having a first outer surface portion that is held in contact with the inboard end surface and a second outer surface portion including a curve surface that modifies to be smooth airflow flowing toward the cove portion from the leading edge portion.

The structure may include a flexible material that is deformed so as to be capable of entering a gap between the slat main body and the main wing during retraction into the fixed leading edge.

The buffering portion may be a curved portion including a curve surface that is provided on the inboard end surface and modifies to be smooth airflow flowing toward the cove portion from the leading edge portion.

The buffering portion may be a fence member provided on the inboard end portion, and the fence member may have a first extending portion that extends to the fuselage side of the aircraft with respect to the inboard end surface and a second extending portion that is provided at a distal end of the first extending portion and extends toward the leading edge portion.

The fence member may be provided in a partial or entire region of an edge portion that is a boundary between the inboard end surface and the inboard-side surface of the cove portion.

The fence member may include a flexible material that is deformed so as to be capable of entering a gap between the slat main body and the main wing during retraction into the fixed leading edge.

The buffering portion may be a porous layer disposed on at least one of the inboard end surface and the inboard-side surface of the cove portion.

The buffering portion may be a blade member that forms the cusp portion and may have a cutout corner portion on a side of the main wing of the aircraft on the fuselage side of the aircraft.

The buffering portion may be a blade member that forms the cusp portion, and the blade member may have a porous layer provided at an inboard-side end portion of the blade member on the fuselage side of the aircraft.

Advantageous Effects of Invention

In accordance with the present invention, noise generated from a slat inboard end portion or a slat supporting/deploying mechanism can be reduced.

MODE(S) FOR CARRYING OUT THE INVENTION

Hereinafter, an embodiment of the present invention will be described with reference to the drawings.

[Overview of High-Lift Device]

Figure 1:
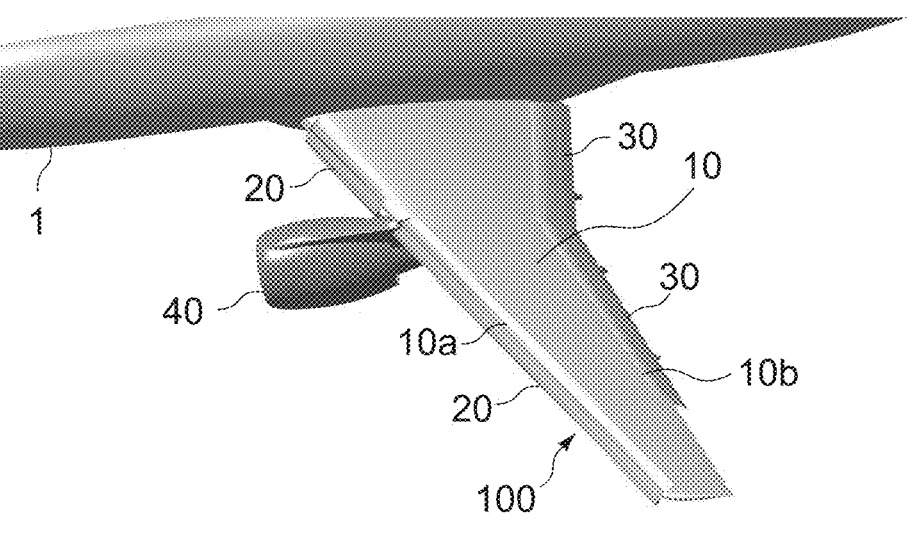
FIG. 1 A partial perspective view of a configuration example of one of aircraft wings as viewed from an upper surface side.
Figure 2:
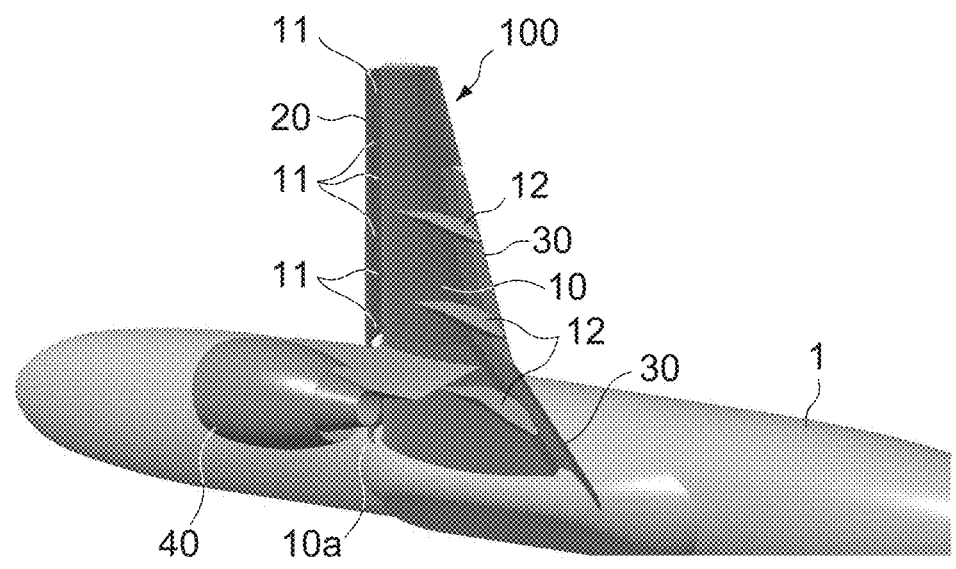
FIG. 2 A partial perspective view of the aircraft wing as viewed from a lower surface side.

FIG. 1 is a partial perspective view of a configuration example of one (left wing) 100 of aircraft wings as viewed from on an upper surface side. FIG. 2 is a partial perspective view of the aircraft wing 100 as viewed from a lower surface side.

The aircraft wing 100 includes a main wing 10, slats 20 disposed on the side of a leading edge 10a of the main wing 10, and flaps 30 disposed on the side of a trailing edge 10b of the main wing 10.

It should be noted that the other (right wing) of the aircraft wings is configured to be similar to the aircraft wing 100.

The slats 20 are configured to be deployable and retractable from/into the leading edge 10a of the main wing 10. The slats 20 are retracted into the leading edge 10a of the main wing 10 as shown in the figure in a cruise phase and deployed from the leading edge 10a of the main wing 10 by slat supporting devices 11 in a landing or take-off phase. The leading edge 10a of the main wing 10 refers to a region facing the slats 20 in the chord direction of the slats 20. It should be noted that in the following description, the leading edge 10a will be also referred to as a fixed leading edge 10a.

The flaps 30 are configured to be deployable and retractable from/into the trailing edge 10b of the main wing 10. The flaps 30 are retracted into the trailing edge 10b of the main wing 10 as shown in the figure in a cruise phase and deployed from the trailing edge 10b of the main wing 10 through flap supporting devices 12 in a landing or take-off phase.

The slats 20 are typically often divided into a plurality of slats along the fixed leading edge 10a with the engine 40 provided therebetween. The length of each slat 20 in a wing span direction is arbitrarily set to be a necessary length depending on an arrangement region. Also, the flaps 30 are typically often divided into a plurality of flaps along the trailing edge 10b of the main wing 10, each having an arbitrary length. The slats 20 and the flaps 30 are made of, for example, a metal material such as an aluminum alloy or a stainless steel or a composite material such as carbon fiber reinforced plastics (CFRP) or glass fiber reinforced plastics (GFRP).

The slat 20 is one of the leading-edge high-lift devices. Providing a gap between the slat 20 and the main wing 10, which allows airflow to pass therethrough during deployment, increases maximum lift (upper limit of lift) of the aircraft wing 100 and also increases a stall angle of attack of the aircraft wing 100. The size of the gap between the slat 20 and the main wing 10 is adjusted depending on a degree (angle) of deployment of the slat 20 from the main wing 10. Typically, the slat 20 is more largely deployed in a landing phase than in a take-off phase.

Technical Problems of Slats

Next, technical problems of the slats will be described using a slat 201 in a cross-sectional shape shown in FIG. 3 and a slat 202 with a configuration shown in FIG. 6. It should be noted that the slat 201 and the slat 202 are models used in numerical simulation to be described later, so detailed descriptions of the respective parts are omitted here.

Figure 3:
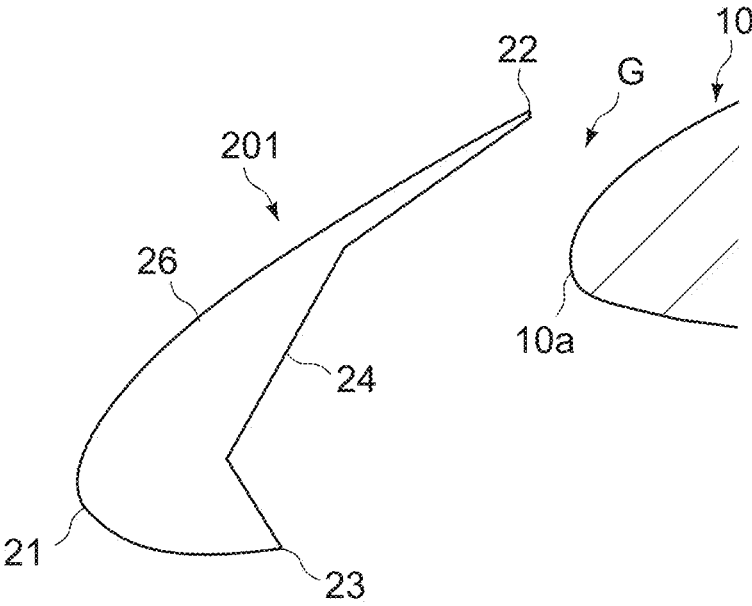
FIG. 3 A schematic cross-sectional view of a slat perpendicular to a wing span direction of a main wing.

FIG. 3 is a schematic cross-sectional view of the slat 201 perpendicular to the wing span direction of the main wing 10 and shows a state in a landing phase in which the slat 201 is deployed at the maximum (fully deployed) from the fixed leading edge 10a.

The slat 201 includes a leading edge portion 21, a trailing edge portion 22, a cusp portion 23, a cove portion 24, and an upper surface portion 26. As shown in FIG. 3, the cross-sectional shape of the slat 201 is a shape that forms a closed space surrounded by the leading edge portion 21, the trailing edge portion 22, the cusp portion 23, the cove portion 24, and the upper surface portion 26. Here, the upper surface portion 26 means a region opposite to the cove portion 24 substantially in a thickness direction of the sl01.

The slat 201 has a function of increasing an upper limit of lift (maximum lift) of the aircraft wing 100 by providing a gap G between the slat 201 and the fixed leading edge 10a. Meanwhile, the slat 201 generates high aerodynamic noise under flight conditions in an approach and landing phase. One of generation sources of that noise is the cove portion 24 of the slat 201 and turbulence in a reverse flow region formed in the cove portion 24 generates noise.

Figure 4:
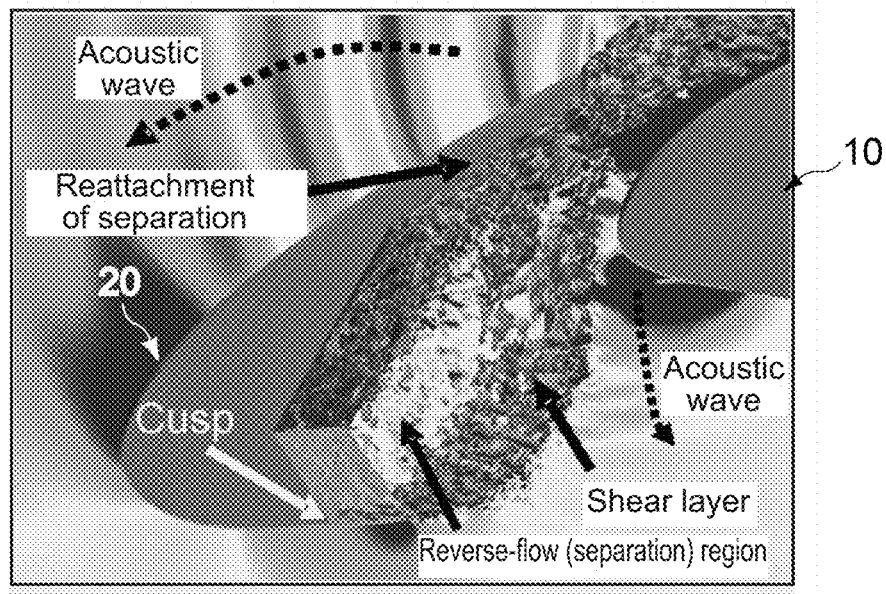
FIG. 4 A diagram showing a numerical simulation result of a flow field in the slat shown in FIG. 3 in a landing phase.

As an example of it, FIG. 4 shows a numerical simulation result of a flow field in a landing phase in the slat 201 shown in FIG. 3. As shown in the figure, a shear layer separated from the cusp portion 23 forms a vortex-like reverse flow region in the cove portion 24 and turbulence of the shear layer is generated with the formation of the reverse flow region. The generated turbulent shear layer is reattached to the cove portion 24 and then passes through the gap G between the slat 201 and the main wing 10. When the turbulent shear layer passes through the gap G, it generates noise toward the ground and the upper sky. Noise is generated mainly by pressure fluctuations around a reattachment point of the cove portion 24 where the turbulent shear layer is attached and pressure fluctuations around the trailing edge portion 22 and is transmitted toward the ground and the upper sky.

For example, a method (Patent Literature 1) of adding a curved shape along a shear layer in a reverse flow region by providing the cove portion 24 with a "cove filler" and a method (Patent Literature 2) of providing the cusp portion 23 of the slat lower surface where the reverse flow region is generated with a "serration" that actively mixes a shear layer in the cove portion 24 as described above are known as methods of suppressing noise generation due to the shear layer separated from the cusp portion 23.

Figure 5:
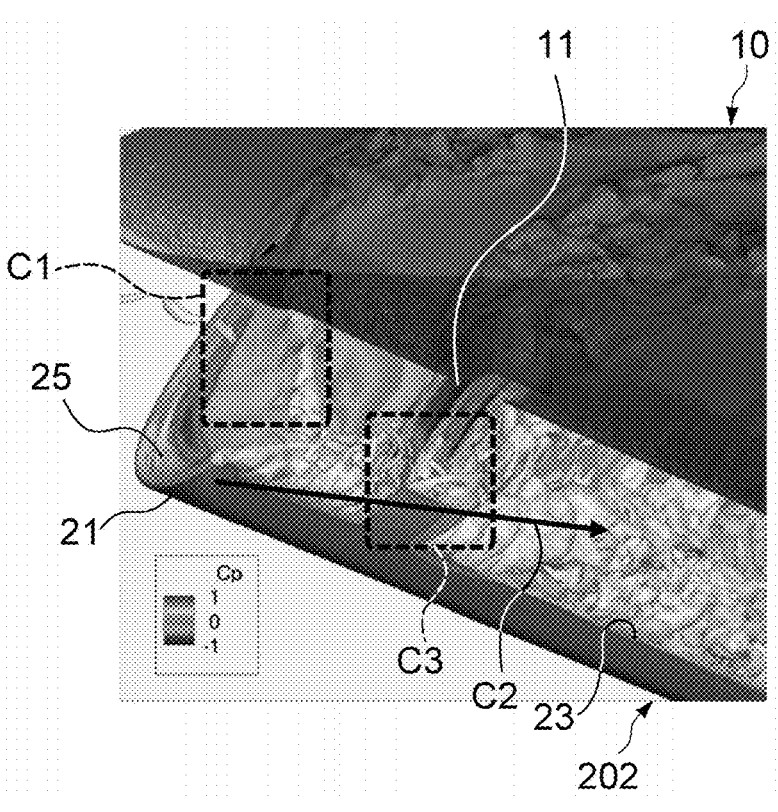
FIG. 5 A numerical simulation result showing an example of an unsteady flow field near an inboard end portion of a slat of a right wing in a landing phase.

However, it has been found from sound source localization in actual scale or a wind tunnel testing model that loud noise other than noise provided by the turbulence of the shear layer in the cove is generated from a slat inboard end portion and a slat supporting mechanism that supports the slat so that the slat can be deployed from the fixed leading edge of the main wing. For example, FIG. 5 shows a numerical simulation result showing an example of an unsteady flow field near an inboard end portion of the slat 202 of the right wing in a landing phase. FIG. 5 visualizes a pressure coefficient distribution of an object surface and an isosurface of vorticity (the same applies to FIGS. 7 and 8 to be described later).

As shown in FIG. 5, it is considered in view of a flow field near the inboard end of the slat 202 that the following airflow separation and interference of the flow cause large pressure fluctuations and causes noise generation.

(1) Airflow separation from an inboard end surface 25 of the slat 202 (see the region C1)

(2) Generation of vortices in a span direction (wing span direction) from an inboard side corner portion of the cusp portion 23 (see the arrow C2)

(3) Interference of (1) or (2) above with the slat supporting device 11 (see the region C3)

Figure 6:
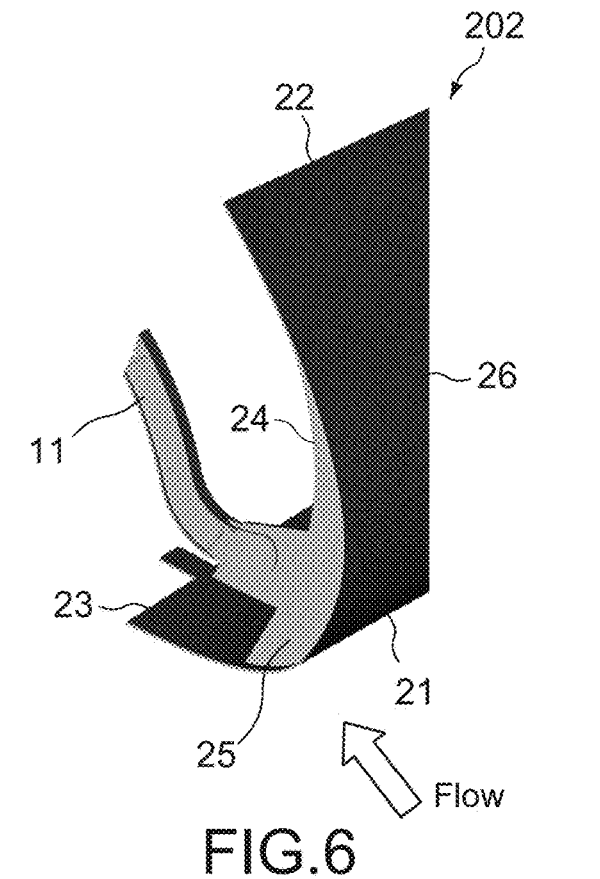
FIG. 6 A perspective view schematically showing an inboard end portion near a slat of a left wing.
Figure 7:
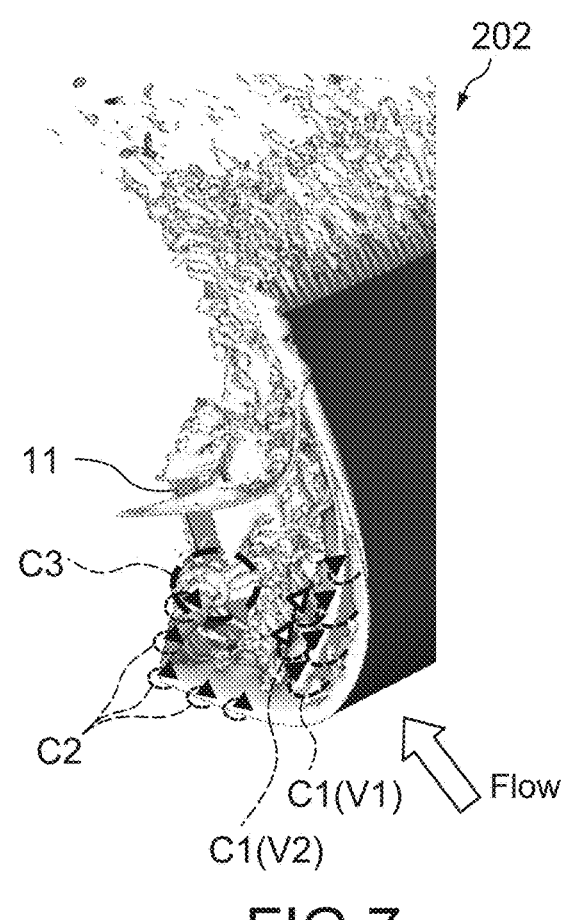
FIG. 7 A numerical simulation result showing an example of an unsteady flow field when a flow acts in the arrow direction in FIG. 6.
Figure 8:
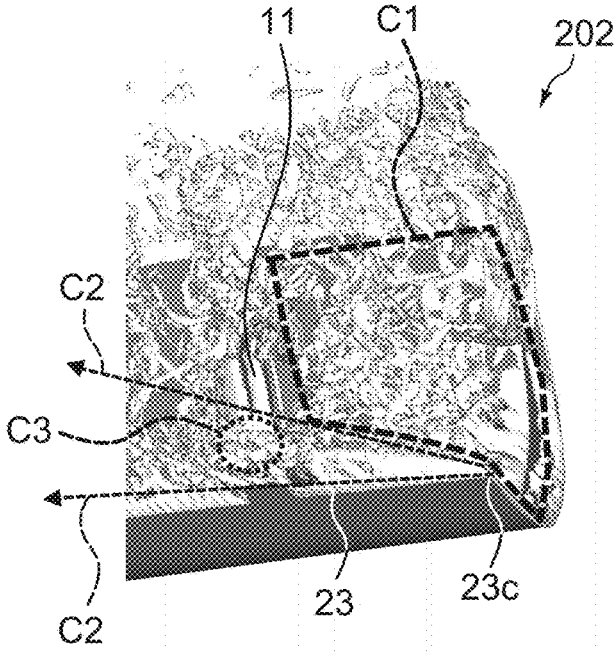
FIG. 8 A numerical simulation result of an unsteady flow field as viewed from the back of the slat in FIG. 7.

FIG. 6 is a perspective view schematically showing the vicinity of an inboard end portion of the slat 202 of the left wing. FIG. 7 is a numerical simulation result showing an example of an unsteady flow field when a flow acts in the arrow direction of FIG. 6. FIG. 8 is a numerical simulation result of the unsteady flow field as viewed from the back of the slat 202 in FIG. 7.

Here, the region C1 in FIG. 5 corresponds to vortices shown as the arrows C1 in FIG. 7 and also corresponds to vortices in the region C1 surrounded by the broken line in FIG. 8. The arrow C2 in FIG. 5 corresponds to vortices shown as the arrows C2 in FIG. 7 and also corresponds to the arrow C2 shown as the broken line in FIG. 8. Then, the region C3 in FIG. 5 corresponds to vortices in the region C3 surrounded by the broken line in FIG. 7 and also corresponds to vortices in the region C3 surrounded by the broken line in FIG. 8.

Figure 9:
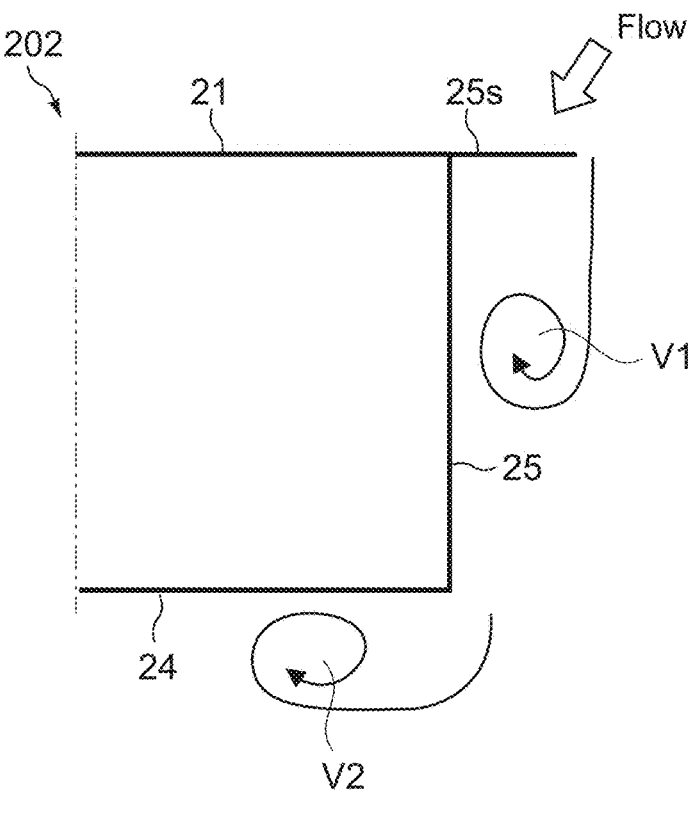
FIG. 9 A schematic cross-sectional view perpendicular to a thickness direction of the slat shown in FIG. 6 for showing a state of generation of vortices generated at an inboard end of the slat.

FIG. 9 is a schematic cross-sectional view perpendicular to a thickness direction of the slat 202 and shows a state of generation of vortices V1 and V2 generated at the inboard end of the slat 202. A set of the vortices V1 and the vortices V2 corresponds to vortices C1 shown in FIGS. 5, 7 and 8.

The vortices V1 correspond to four black arrows on the right side (front side) of the arrows C1 in FIG. 7. The vortices V1 are easily generated more remarkably in a case where the inboard end surface 25 has, at a part of its peripheral portion, a skin portion 25s projected to the inboard side.

On the other hand, the vortices V2 correspond to the region C1 in FIG. 5 or 8 and two white arrows on the left side (deep side) of the arrow C1 in FIG. 7. The vortices V2 can also be considered to be formed together with the flow of the vortices V1.

Moreover, the vortices shown as the arrow C2 in FIG. 8 is generated in the span direction due to the flow separated from an inboard side corner portion 23c of the cusp portion 23.

In addition, the vortices shown in the region C1 and the arrow C2 in FIG. 8, in particular, the vortices shown as C2 passes through the slat cove portion 24, hits the slat supporting device 11, and causes turbulence, which is a noise source due to interference of the vortices shown as C1 and C2 with the slat supporting device 11.

The "cove filler" and "serration" according to Patent Literatures 1 and 2 described above cannot reduce such noise on the slat inboard side. Moreover, noise from the slat inboard end portion and the slat supporting mechanism is larger at some frequencies than noise provided by the reverse flow region formed in the cove as described above. Therefore, the noise level as the overall aircraft cannot be lowered unless the noise from the slat inboard end portion and the like can be reduced.

In view of this, the leading-edge high-lift device according to the present embodiment includes the following means for reducing noise from the slat inboard end portion.

(1) To reduce pressure fluctuations due to separation from the slat inboard end surface. Specifically, (1-1) To suppress separation itself by flow modification at the slat inboard end portion.

(1-2) To set the separation region away from a surface of the cove portion.

(1-3) To lower the flow velocity of a separated flow.

(1-4) To lower fluid velocity that causes pressure fluctuations on the surface of the cove portion.

(2) To suppress generation of strong vortices from the inboard side corner portion of the cusp portion 23 or change a path where vortices are generated in order to avoid the interference, to thereby reduce pressure fluctuations generated at the slat inboard end portion. Specifically, (2-1) To change the shape of the inboard-side end portion of the cusp portion 23

(2-2) To change the material of the inboard-side end portion of the cusp portion 23.

Hereinafter, a slat that is the leading-edge high-lift device according to the present invention will be described in detail with discrete embodiments.

First Embodiment

Configuration Example 1-1

Figure 10:
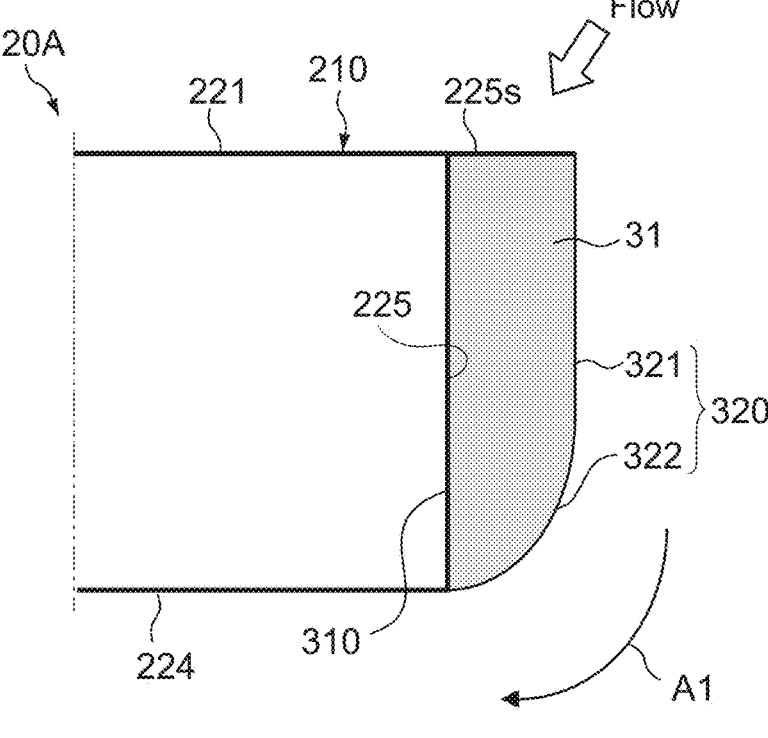
FIG. 10 A schematic view of a slat according to Configuration Example 1-1 that is an embodiment of the present invention, which is a schematic cross-sectional view of a slat of a left wing, which is perpendicular to a thickness direction.

FIG. 10 is a schematic view of a slat 20A according to the present embodiment for describing Configuration Example 1-1, which is a schematic cross-sectional view perpendicular to a thickness direction of the slat 20A of the left wing. It should be noted that a slat of the right wing is configured to be left right symmetric to the slat of the left wing.

The slat 20A according to the present embodiment includes a slat main body 210 and a buffering member 31 as a buffering portion disposed at its end portion on the inboard side.

Figure 11:
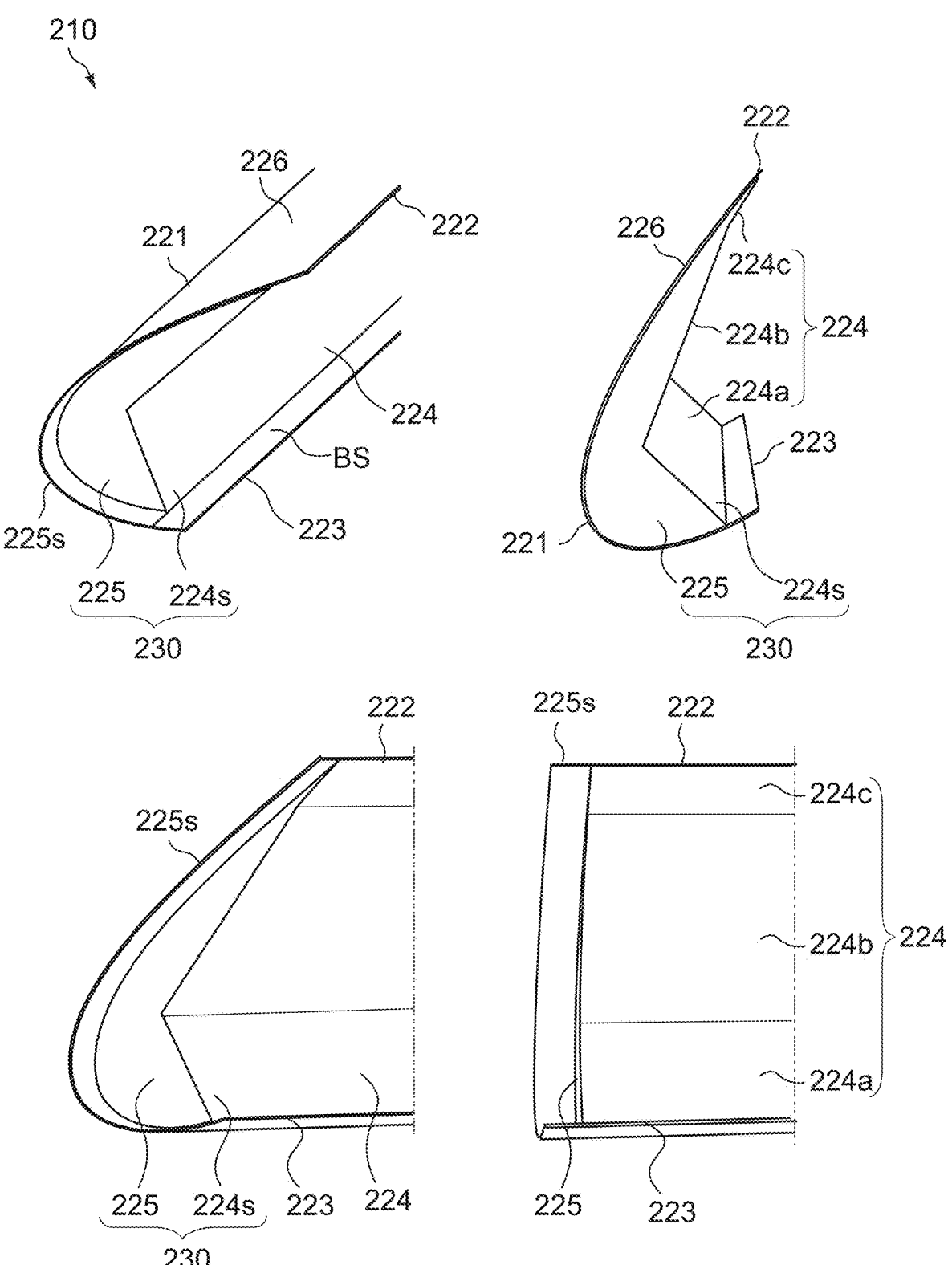
FIG. 11 A view showing a configuration example of a slat main body of a right wing in which the upper left part is a partial perspective view of the slat main body as viewed from the inboard side, the upper right part is a side view of the slat main body as viewed from the inboard side, the lower left part is a partial perspective view of the slat main body as viewed from the rear inboard side, and the lower right part is a partial rear view of the slat main body as viewed from the back.

The slat main body 210 includes a leading edge portion 221, a trailing edge portion 222, a cusp portion 223, a cove portion 224, an inboard end surface 225, and an upper surface portion 226 (see FIG. 11). The slat main body 210 is made of, for example, a metal material such as an aluminum alloy or a stainless steel or a composite material such as carbon fiber reinforced plastics (CFRP) or glass fiber reinforced plastics (GFRP). The slat main body 210 corresponds to a slat with the conventional structure optimized only in terms of the aerodynamic performance.

The buffering member 31 is provided in the inboard end portion 230 (see FIG. 11) of the slat main body 210 including the inboard end surface 225 of the slat main body 210 and the inboard-side surface of the cove portion 224 and reduces pressure fluctuations in airflow on the inboard end surface 225 and the inboard-side surface of the cove portion 224. In the present embodiment, the buffering member 31 modifies to be smooth airflow flowing toward the cove portion 224 from the leading edge portion 221 of the slat main body 210, to thereby inhibit airflow separation on the inboard end portion of the slat 210. Accordingly, pressure fluctuations around the inboard end portion of the slat 210 are reduced.

FIG. 11 is a view showing a configuration example of the slat main body 210 of the right wing. In FIG. 11, the upper left part is a partial perspective view of the slat main body 210 as viewed from the inboard side, the upper right part is a side view of the slat main body 210 as viewed from the inboard side, the lower left part is a partial perspective view of the slat main body 210 as viewed from the rear inboard side, and the lower right part is a partial rear view of the slat main body 210 as viewed from the back.

The leading edge portion 221 has a streamline shape protruding forwards (to a side opposite to the main wing 10). The leading edge portion 221 is formed continuously with the upper surface portion 226.

The trailing edge portion 222 is a tip end portion of the edge formed by the rear end portion of the cove portion 224 and the rear end portion of the upper surface portion 226 and forms a gap G between the trailing edge portion 222 and the main wing 10 during deployment (see FIG. 3).

The cusp portion 223 is formed by a tip end portion of a blade seal BS protruding toward the fixed leading edge 10a, the blade seal BS being disposed at the lower edge of the leading edge portion 221. The blade seal BS is configured as an extension portion that forms the cusp portion 223 and also has a function of shielding a gap between the main wing 10 and the slat leading edge portion lower edge during retraction of the slat into the main wing 10.

The cove portion 224 is a lower surface of the slat main body 210 and is also a concave surface formed between the cusp portion 223 and the trailing edge portion 222. The cove portion 224 is a portion proximate to the fixed leading edge 10a during retraction. The cove portion 224 is, here as shown in FIG. 11, formed in a polyhedron shape having a first plane portion 224a, a second plane portion 224b, and a third plane portion 224c. The first plane portion 224a is a plane portion formed on the side of the lower edge of the leading edge portion 221. The third plane portion 224c is a plane portion formed on the side of the trailing edge portion 222. The second plane portion 224b is a plane portion that couples the first plane portion 224a with the third plane portion 224c. It should be noted that the cove portion 224 is not limited to the example in which it is formed in the polyhedron shape shown in the figure, and the cove portion 224 may be formed in a curved shape protruding forwards.

The inboard end surface 225 of the slat main body 210 refers to a side surface on the inboard side of the slat main body 210. The inboard end surface 225 of the slat main body 210 refers to a side surface on the side of a fuselage 1 of the aircraft as to a slat (hereinafter, also referred to as an inboard slat) positioned on the inboard side with respect to the engine 40 (see FIGS. 1 and 2). The inboard end surface 225 of the slat main body 210 refers to a side surface on the engine side as to a slat positioned on the outboard side with respect to the engine 40. The inboard end surface 225 is formed in a substantially flat plane portion surrounded by the leading edge portion 221, the cove portion 224, and the upper surface portion 226. The inboard end surface 225 has, at a part of its peripheral portion, a skin portion 225s projected to the inboard side. The skin portion 225s is formed in a peripheral portion extending from the blade seal BS to the trailing edge portion 222 through the leading edge portion 221 and the upper surface portion 226.

The inboard end portion 230 of the slat main body 210 refers to a region including the inboard end surface 225 and an inboard-side surface 224s of the cove portion 224. The inboard-side surface 224s of the cove portion 224 is a region on the inboard side of the first to third plane portions 224a to 224c of the cove portion 224. Its range also includes a region corresponding to the region C1 shown in FIG. 8 and a surface region on the inboard side of the blade seal BS that forms the cusp portion 223.

Figure 12:
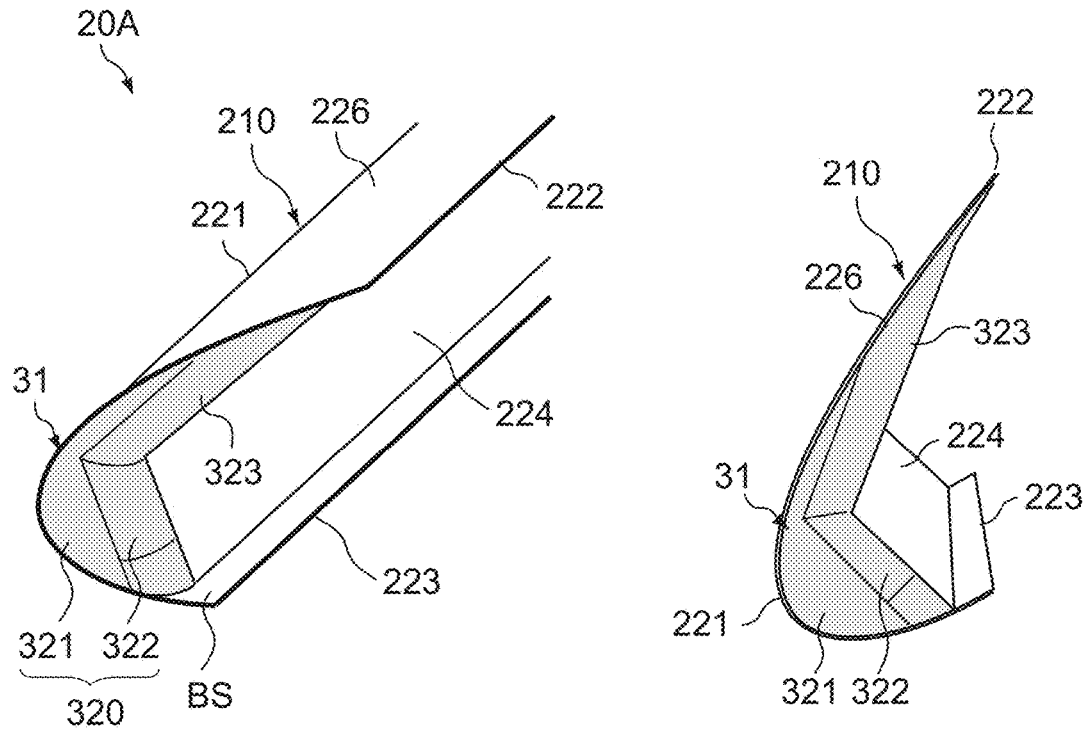
FIG. 12 A view showing a configuration of the slat according to Configuration Example 1-1 in which the upper left part is a partial perspective view of the slat as viewed from the inboard side, the upper right part is a side view of the slat as viewed from the inboard side, the lower left part is a partial perspective view of the slat as viewed from the rear inboard side, and the lower right part is a partial rear view of the slat as viewed from the back.
Figure 12:
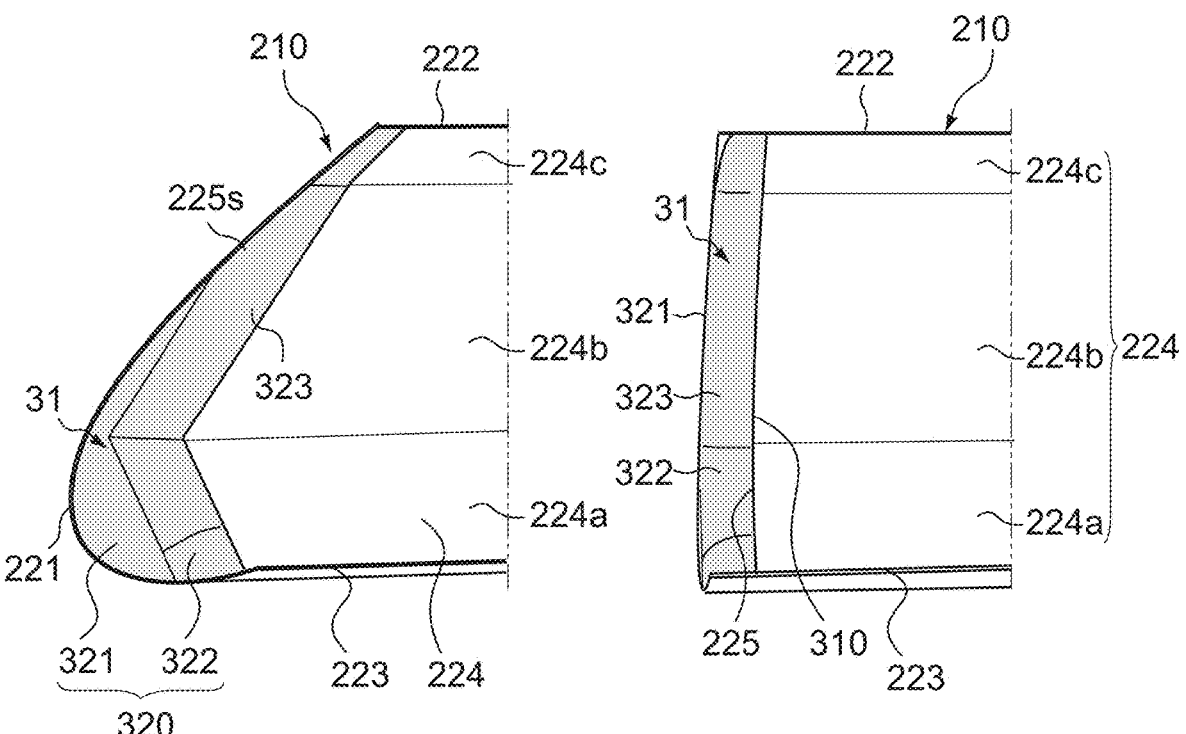

FIG. 12 is a view showing a configuration of the slat 20A according to the present embodiment in which the buffering member 31 is attached to the above-mentioned slat main body 210. The upper left part is a partial perspective view of the slat 20A as viewed from the inboard side, the upper right part is a side view of the slat 20A as viewed from the inboard side, the lower left part is a partial perspective view of the slat 20A as viewed from the rear inboard side, and the lower right part is a partial rear view of the slat 20A as viewed from the back.

As shown in FIG. 12, the buffering member 31 is mounted on the inboard end surface 225 so as to fill a space formed between the inboard end surface 225 of the slat main body 210 and the skin portion 225s of its peripheral portion. A side surface shape of the buffering member 31 as viewed from the inboard side of the slat 20A is formed to be the same or substantially the same shape as the inboard end surface 225 of the slat main body 210.

The buffering member 31 includes a first outer surface portion 310 that is heled in contact with the inboard end surface 225 of the slat main body 210 and a second outer surface portion 320 that modifies to be smooth airflow flowing toward the cove portion 224 from the leading edge portion 221 of the slat main body 210 as shown by the arrow A1 in FIG. 10.

The first outer surface portion 310 is a side surface portion of the buffering member 31, which is opposite to the inboard end surface 225. The first outer surface portion 310 is formed in a plane shape corresponding to the inboard end surface 225 of the slat main body 210. In the buffering member 31, the first outer surface portion 310 and the inboard end surface 225 are fixed to each other with an appropriate fastener such as a bolt. The thickness of the buffering member 31 in the wing span direction is equal to or smaller than the height of projection of the skin portion 225s from the inboard end surface 225.

The second outer surface portion 320 is a surface region that forms the inboard outer appearance of the slat 20A and includes a flat portion 321, a first curve surface portion 322, and a second curve surface portion 323. The flat portion 321 is formed as a plane portion located on the inboard side of the leading edge portion 221 of the slat main body 210 and parallel to the chord direction. The first curve surface portion 322 is formed as a curved portion that smoothly (continuously) connects the flat portion 321 to the first plane portion 224a of the cove portion 224. The second curve surface portion 323 is formed as a curved portion that smoothly (continuously) connects the flat portion 321 to the second plane portion 224b of the cove portion 224. The first curve surface portion 322 and the second curve surface portion 323 form a curve surface that modifies to be smooth the airflow flowing toward the cove portion 224 from the leading edge portion 221.

The buffering member 31 is typically made of a rigid material such as a metal material. The buffering member 31 may be made of an elastic material such as a rubber material or may be made of a flexible material deformable in a predetermined shape. In particular, in a case where the buffering member 31 is made of a flexible material, the buffering member 31 is deformed so as to be capable of entering the gap between the inboard end surface 225 of the slat 20A and the main wing 10 during retraction of the slat 20A into the main wing 10, and the property of retraction of the slat 20A into the main wing 10 can be enhanced. Moreover, the gap between the inboard end surface 225 of the slat 20A and the main wing 10 can be filled with the buffering member 31 during retraction into the main wing 10. Thus, target aerodynamic performance of the aircraft wing 100 in a cruise phase can be provided.

In this case, the buffering member 31 is made of, for example, a material (e.g., elastic material or shape memory alloy) or a structure having built-in various mechanisms (e.g., link mechanisms), which is capable of bulging in a target shape during deployment and being crushed during retraction.

In the slat 20A according to the present embodiment configured in the above-mentioned manner, the buffering member 31 having the above-mentioned configuration is mounted on the inboard end surface 225 of the slat main body 210. Therefore, a step of the slat inboard end portion can be reduced as much as possible as compared to a case where no buffering member 31 is mounted. In particular, the second outer surface portion 320 of the buffering member 31 has the first curve surface portion 322 and the second curve surface portion 323 continuous with the inboard-side surface of the cove portion 224. Therefore, the airflow flowing toward the cove portion 224 from the leading edge portion 221 of the slat 20A can be modified to be smooth. Accordingly, airflow separation on the inboard end portion of the slat 20A can be inhibited during deployment from the main wing 10, pressure fluctuations around the inboard end portion of the slat 20A can be reduced, and noise generation can be suppressed.

Furthermore, in accordance with the present embodiment, airflow separation on the inboard end portion 230 of the slat main body 210 can be inhibited. Therefore, interference of the airflow separated from the inboard end portion 230 with the slat supporting device 11 can also be inhibited. Accordingly, noise generation, which is caused by the interference between the airflow (vortices) separated from the inboard end portion 230 and the slat supporting device 11, can also be reduced.

Second Embodiment

Configuration Example 1-2

Figure 13:
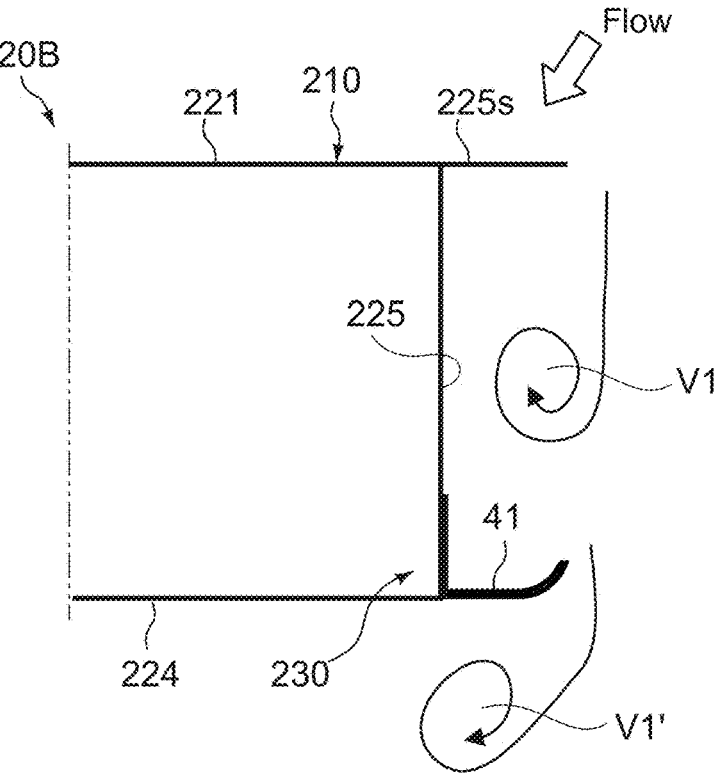
FIG. 13 A schematic view of a slat according to Configuration Example 1-2 that is an embodiment of the present invention, which is a schematic cross-sectional view of a slat of a left wing, which is perpendicular to a thickness direction.
Figure 14:
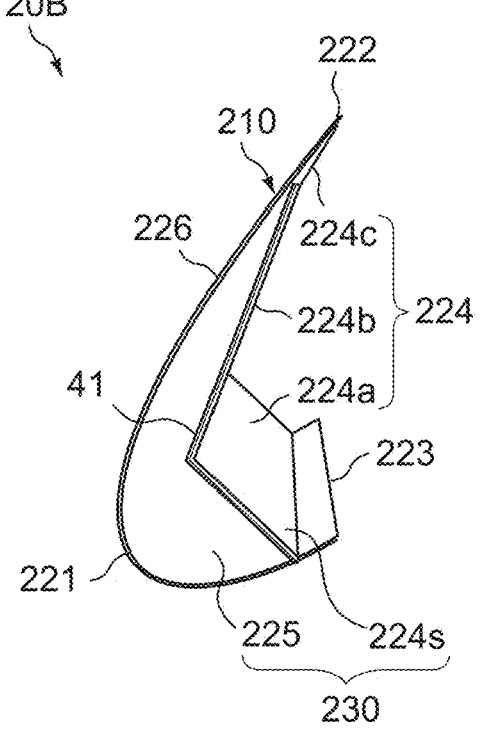
FIG. 14 A side view of a slat of a right wing as viewed from the inboard side.

FIG. 13 is a schematic view of a slat 20B according to the present embodiment for describing Configuration Example 1-2, which is a schematic cross-sectional view perpendicular to a thickness direction of the slat 20B of the left wing. FIG. 14 is a view showing a configuration example of the slat 20B of the right wing, which is a side view as viewed from the inboard side.

The slat 20B according to the present embodiment includes a slat main body 210 and a fence member 41 as a buffering portion, which is provided in its inboard end portion 230. The slat main body 210 is similar to that in the first embodiment, so a detailed description thereof will be omitted.

The fence member 41 is provided on the inboard end portion 230 of the slat main body 210 (see FIG. 11) and reduces pressure fluctuations in airflow on the inboard end surface 225 and the inboard-side surface of the cove portion 224. In the present embodiment, the fence member 41 is provided in a partial or entire region of an edge portion that is a boundary between the inboard end surface 225 of the slat main body 210 and the inboard-side surface 224s of the cove portion 224.

Figure 15:
FIG. 15 A schematic cross-sectional view of a fence member.
Figure 15:
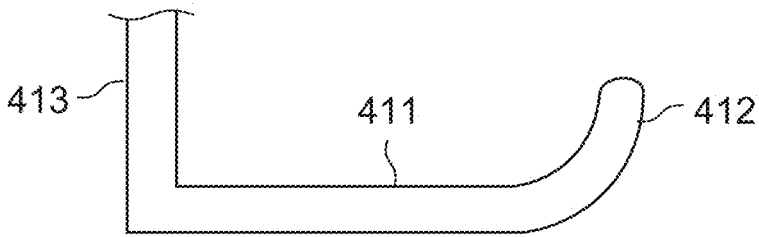

FIG. 15 is a schematic cross-sectional view of the fence member 41. The fence member 41 includes a first extending portion 411, a second extending portion 412, and a fixed portion 413. The first extending portion 411 extends to the inboard side (side of the fuselage 1 of the aircraft) with respect to the inboard end surface 225 of the slat main body 210. The second extending portion 412 is provided at a distal end of the first extending portion 411 and extends toward a leading edge portion 221. The fixed portion 413 is fixed to the inboard end surface 225.

The second extending portion 412 is typically formed by bending a distal end portion of the first extending portion 411 toward the leading edge portion 221. The angle of bending the second extending portion 412 with respect to the first extending portion 411 is not particularly limited, and is 90 degrees, for example.

It should be noted that the fence member 41 is not limited to the case where it is fixed to the inboard end surface 225 of the slat main body 210, and the fence member 41 may be fixed to, for example, the inboard-side surface 224s of the cove portion 224. In this case, the fixed portion 413 is formed in parallel with the first extending portion 411.

The first extending portion 411 and the second extending portion 412 of the fence member 41 face the skin portion 225s of the inboard end surface 225 of the slat main body 210. Accordingly, the fence member 41 partitions an area between the inboard end surface 225 and the cove portion 224. As a result, during deployment of the slat 20B, airflow (vortices V1) separated at the inboard end surface 225 is changed into vortices V1' going around the outside of the fence member 41 as shown in FIG. 13. Setting the airflow separation region away from the cove portion 224 by the use of the fence member 41 in this manner can reduce pressure fluctuations around the inboard-side surface 224s of the cove portion 224 and can suppress noise generation.

Furthermore, in accordance with the present embodiment, the fence member 41 can inhibit the airflow separated on the inboard end surface 225 from reaching the surface of the cove portion 224 and can inhibit airflow separation on the inboard-side surface 224s of the cove portion 224. Therefore, interference of the airflow separated on the inboard end surface 225 and the surface of the cove portion 224 with the slat supporting device 11 can also be inhibited. Accordingly, noise generation, which is caused by the interference between the airflow (vortices) separated from the inboard end portion 230 of the slat main body 210 and the slat supporting device 11, can also be reduced.

The fence member 41 is made of, for example, a metal material such as an aluminum alloy or a stainless steel or a composite material such as carbon fiber reinforced plastics (CFRP) or glass fiber reinforced plastics (GFRP). The fence member 41 is not limited to the example in which it is constituted by a member other than the slat main body 210, and the fence member 41 may be integrally formed as a part of the slat main body 210.

Alternatively, the fence member 41 may be made of a flexible material that is deformed so as to be capable of entering the gap between the slat main body 210 and the main wing 10 during retraction into the fixed leading edge 10a. Accordingly, the property of retraction of the slat 20B into the main wing 10 can be enhanced.

Third Embodiment

Configuration Example 1-3

Figure 16:
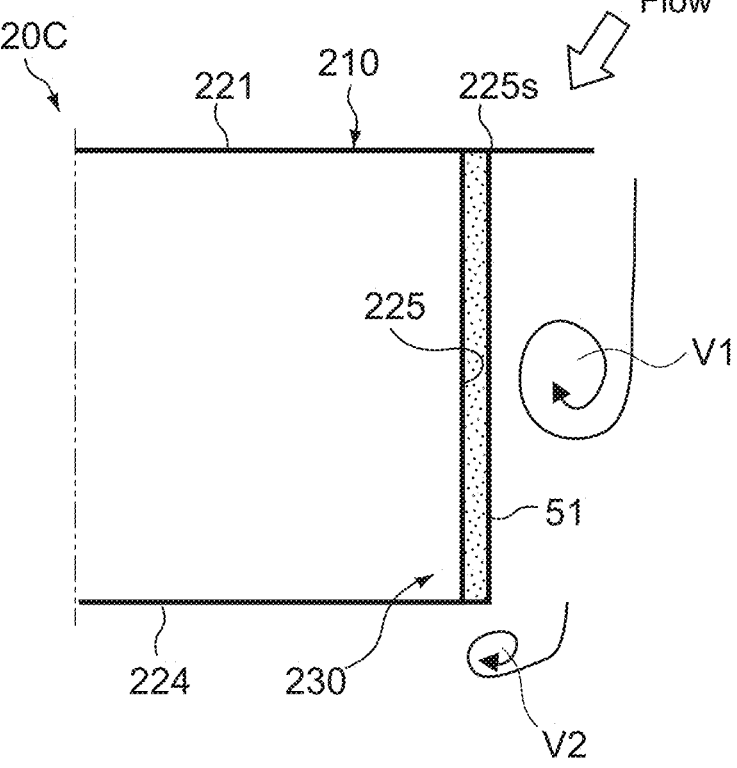
FIG. 16 A schematic view of a slat according to Configuration Example 1-3 that is an embodiment of the present invention, which is a schematic cross-sectional view of a slat of a left wing, which is perpendicular to a thickness direction.
Figure 17:
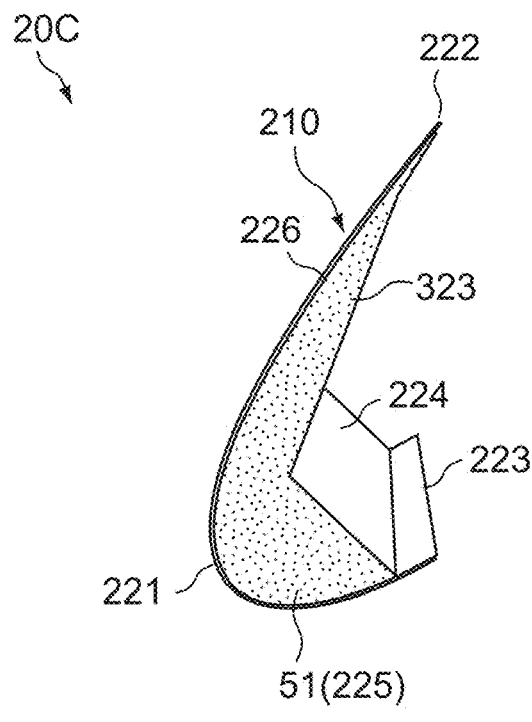
FIG. 17 A side view of the slat of the right wing as viewed from the inboard side.

FIG. 16 is a schematic view of a slat 20C according to the present embodiment for describing Configuration Example 1-3, which is a schematic cross-sectional view perpendicular to a thickness direction of the slat 20C of the left wing. FIG. 17 is a view showing a configuration example of the slat 20C of the right wing, which is a side view as viewed from the inboard side.

The slat 20C according to the present embodiment includes a slat main body 210 and a porous layer 51 as a buffering portion provided on its inboard end surface 225. The slat main body 210 is similar to that in the first embodiment, so a detailed description thereof will be omitted.

The porous layer 51 is made of a porous material having a plurality of holes in communication with one another inside the layer. The porous material is typically made of an inorganic material such as a metal material or a metal oxide material, though not limited thereto. The porous material may be made of a synthetic resin material or a ceramic material, for example. The porous layer 51 may be a plate-like member mounted on the inboard end surface 225 of the slat main body 210 or may be a porous structure surface formed by surface machining on the inboard end surface 225.

The porous layer 51 provided in the entire region or substantially the entire region of the inboard end surface 225 of the slat main body 210 can lower the flow velocity of a flow passing through the porous layer 51. Accordingly, pressure fluctuations in airflow on the inboard end surface 225 can be reduced. Moreover, the flow velocity on the inboard end surface 225 can be lowered. Therefore, airflow separation on the surface of the cove portion 224 can also be suppressed. Accordingly, generation of the vortices V2 on the surface of the cove portion 224 can be suppressed. As a result, pressure fluctuations around the inboard end portion 230 of the slat main body 210 are reduced, and noise reduction can be achieved.

Figure 18:
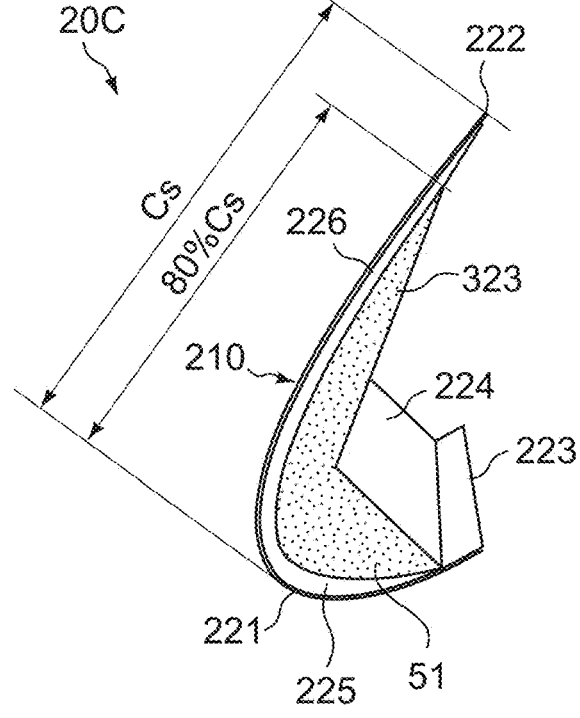
FIG. 18 A side view of a slat as viewed from the inboard side for showing a modified example of Configuration Example 1-3.
Figure 19:
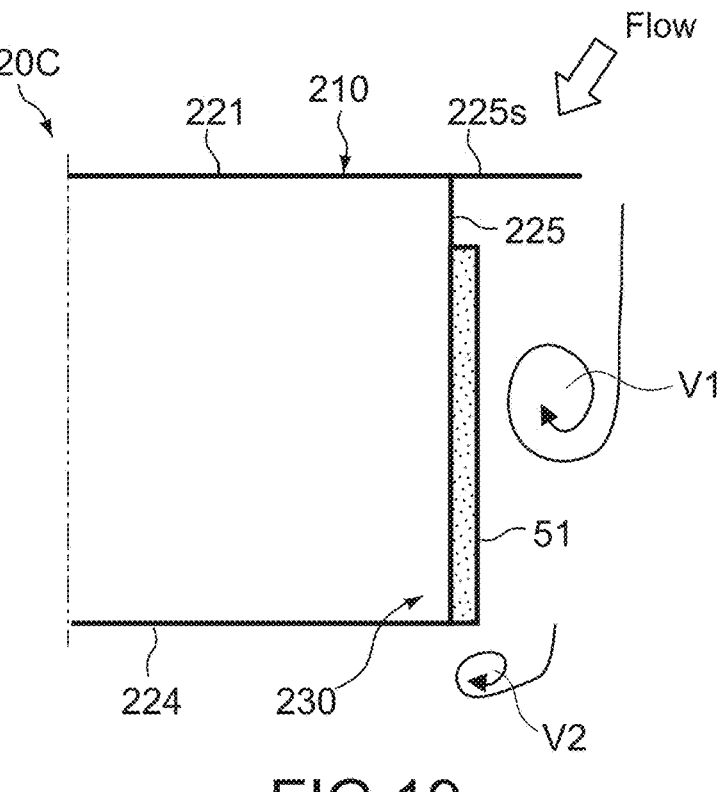
FIG. 19 A schematic view of the slat for showing a modified example of Configuration Example 1-3, corresponding to FIG. 16.

Furthermore, in accordance with the present embodiment, interference of the airflow separated from the inboard end surface 225 and the surface of the cove portion 224 with the slat supporting device 11 can also be inhibited. Accordingly, noise generation, which is caused by the interference between the airflow (vortices) separated from the inboard end portion 230 of the slat main body 210 and the slat supporting device 11, can also be reduced. The porous layer 51 may be selectively provided only in a partial region of the inboard end surface 225 of the slat main body 210. In this case, assuming that the chord length of the slat 20 C (slat main body 210) is denoted by Cs, the porous layer 51 is favorably provided in a length range of 80% of the chord length Cs in the chord direction from the leading edge portion 221 on the inboard end surface 225, for example, as shown in FIGS. 18 and 19.

At this time, the porous layer 51 is favorably provided so as to cover a boundary portion between the inboard end surface of the slat main body 210 and the cove portion 224. Moreover, as to the side of the leading edge portion 221, the porous layer 51 may be spaced away from the peripheral portion of the inboard end surface 225 by about half of a distance corresponding to the amount of projection of the skin portion 225s. The arrangement region of the porous layer 51 set in this manner is a region where pressure fluctuations in airflow on the inboard end surface 225 are easily generated. Therefore, providing the porous layer 51 in such a region can minimize the area where the porous layer 51 is provided and can most effectively reduce pressure fluctuations around the inboard end surface 225.

Fourth Embodiment

Configuration Example 1-4

Figure 20:
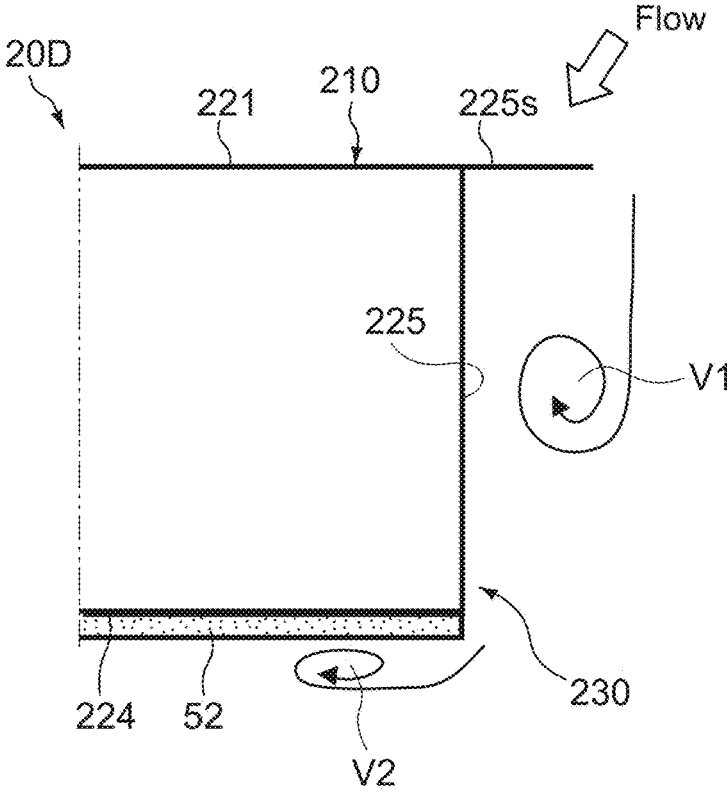
FIG. 20 A schematic view of a slat according to Configuration Example 1-4 that is an embodiment of the present invention, which is a schematic cross-sectional view of a slat of a left wing, which is perpendicular to a thickness direction.
Figure 21:
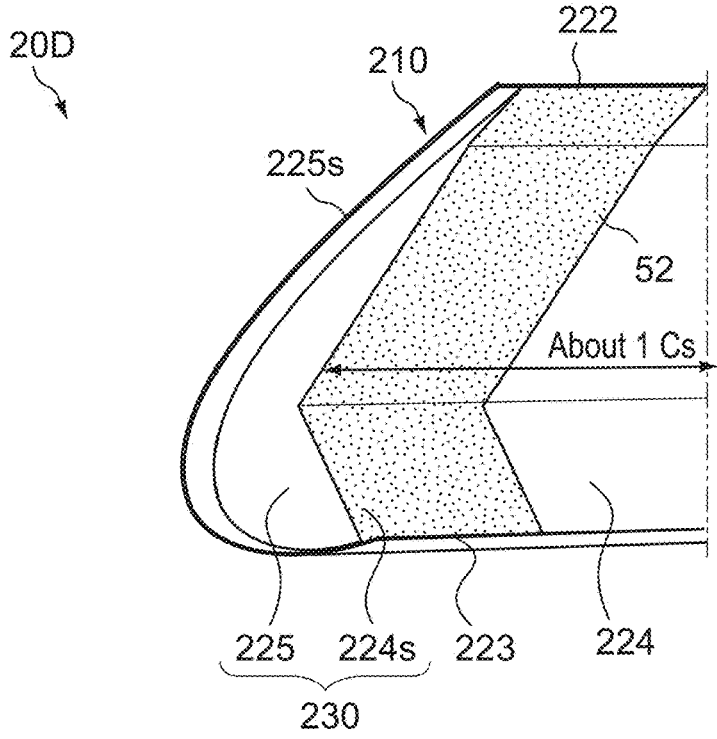
FIG. 21 A partial perspective view of the slat of the right wing as viewed from the rear inboard side.

FIG. 20 is a schematic view of a slat 20D according to the present embodiment for describing Configuration Example 1-4, which is a schematic cross-sectional view perpendicular to a thickness direction of the slat 20D of the left wing. FIG. 21 is a view showing a configuration example of the slat 20D of the right wing, which is a partial perspective view as viewed from the rear inboard side.

The slat 20D according to the present embodiment includes a slat main body 210 and a porous layer 52 as a buffering portion provided on its inboard-side surface 224s of the cove portion 224. The slat main body 210 is similar to that in the first embodiment, so a detailed description thereof will be omitted.

The porous layer 52 is made of a porous material having a plurality of holes in communication with one another inside the layer as in the above-mentioned porous layer 51.

The porous material is typically made of an inorganic material such as a metal material or a metal oxide material, though not limited thereto. The porous material may be made of a synthetic resin material or a ceramic material, for example. The porous layer 52 may be a plate-like member mounted on the inboard-side surface 224s of the cove portion 224 or may be a porous structure surface formed by surface machining on the inboard-side surface 224s of the cove portion 224.

The porous layer 52 provided in an entire region or partial region of the inboard-side surface 224s of the cove portion 224 can lower the flow velocity of a flow passing through the porous layer 52 and suppress generation of the vortices V2 on the surface of the cove portion 224. Accordingly, pressure fluctuations around the inboard-side surface 224s of the cove portion 224 are reduced. Therefore, noise reduction on the inboard-side surface 224s of the cove portion 224 can be achieved.

Furthermore, in accordance with the present embodiment, noise generation, which is caused by the interference with the slat supporting device 11, can be reduced because the interference of the airflow separated on the surface of the cove portion 224 with the slat supporting device 11 can also be inhibited.

Figure 22:
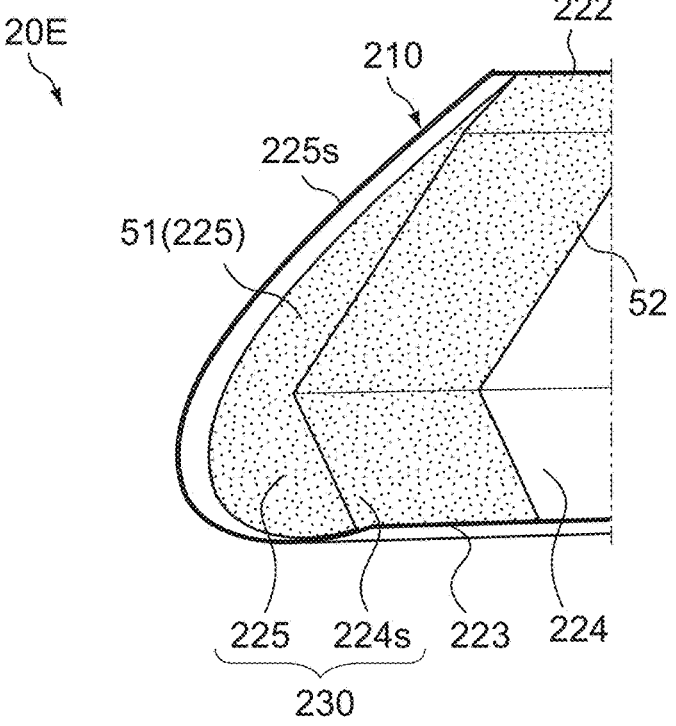
FIG. 22 A partial perspective view showing another configuration example of the slat shown in FIG. 21.

Furthermore, the present embodiment may be combined with the above-mentioned third embodiment. In this case, the porous layer 51 is provided on the inboard end surface 225 of the slat main body 210 as in a slat 20E shown in FIG. 22. Accordingly, not only pressure fluctuations around the inboard-side surface 224s of the cove portion 224 but also pressure fluctuations around the inboard end surface 225 can be reduced. Therefore, the noise reduction effect on the inboard end portion 230 of the slat 210 can be further enhanced.

The region of the inboard-side surface 224s of the cove portion 224 where the porous layer 52 is provided can be arbitrarily set. For example, as shown in FIG. 21, a length range substantially equivalent to the chord length (Cs) of the slat 20D in a span direction (wing span direction) from the inboard end surface 225 in the cove portion 224 may be set to the inboard-side surface 224s of the cove portion 224. The region set in this manner is a region where pressure fluctuations in the airflow in the cove portion 224 are easily generated. Therefore, providing the porous layer 52 in such a region can most effectively reduce pressure fluctuations around the inboard-side surface 224s of the cove portion 224. In this case, the porous layer 52 is not limited to the case where it is provided in the entire region of such a region. As shown in the figure, partially arranging the porous layer 52 in a region with a length of about 0.5 Cs in the span direction from the inboard end surface 225 can also provide a sufficient effect of reducing pressure fluctuations.

It should be noted that as to the chord direction of the cove portion 224, the porous layer 52 may be provided, for example, in a region in a length range of 80% of the chord length Cs toward the trailing edge portion 222 from the side of the cusp portion 223 in the cove portion 224 as in Configuration Example 1-3 (FIG. 18). Providing the porous layer 52 in such a region can keep a mounting region of the porous layer 52 minimum and can most effectively reduce pressure fluctuations around the inboard-side surface 224s of the cove portion 224.

[Characteristic Assessment 1]

Figure 23:
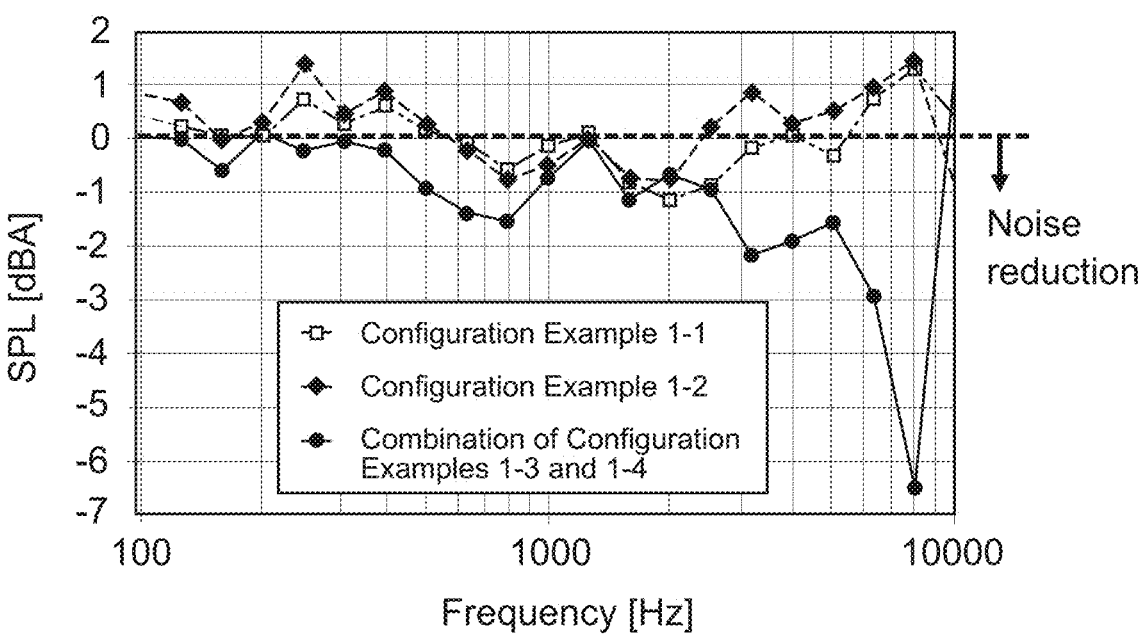
FIG. 23 An experimental result showing frequency characteristics of a noise reduction effect of an inboard end portion of an inboard slat in a directly downward direction of the aircraft.

FIG. 23 shows wind tunnel testing results conducted on the slat according to each of the above-mentioned configuration examples. FIG. 23 shows frequency characteristics of the noise reduction effect in a directly downward direction of the aircraft after computing in actual scale (a difference from a comparative reference mode) as results of checking changes in noise level near the inboard end portion of the inboard slat by noise source localization using a microphone array system. The comparative reference mode refers to a mode on which the slat is constituted by the slat main body 210 alone.

In FIG. 23, Configuration Example 1-1 corresponds to the slat 20A according to the first embodiment, Configuration Example 1-2 corresponds to the slat 20B according to the second embodiment, and a combination of Configuration Examples 1-3 and 1-4 corresponds to the slat 20E according to a combination of the third embodiment with the fourth embodiment. As it can be seen from the figure, although the noise level increases at some frequencies, the slat according to each configuration example can generally provide the noise reduction effect. In particular, the slat 20E according to the combination of Configuration Examples 1-3 and 1-4 provided the noise reduction effect in substantially the entire frequency band.

Fifth Embodiment

Configuration Example 2-1

Figure 24:
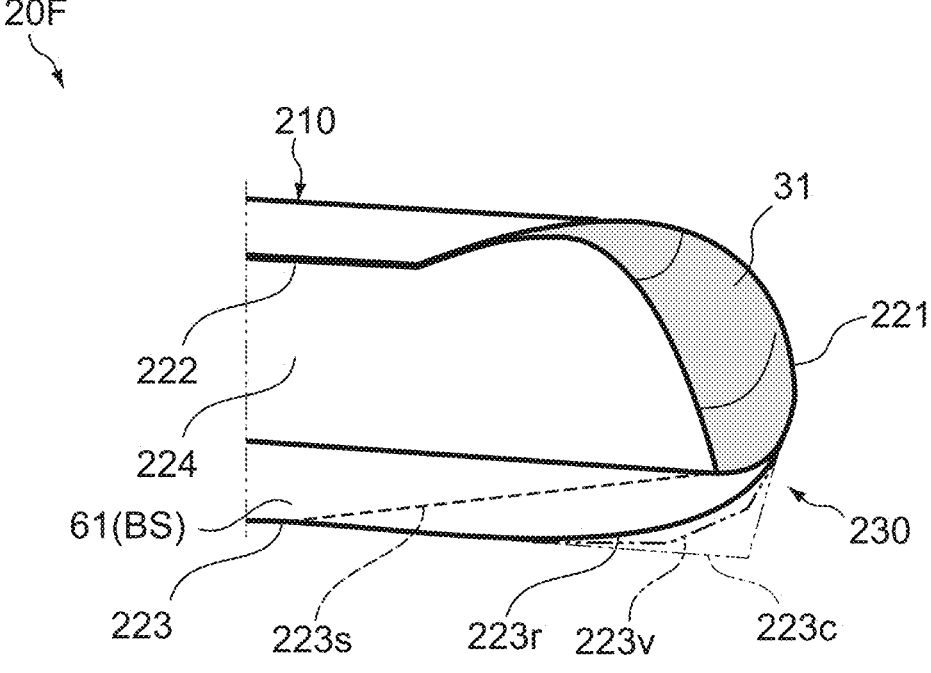
FIG. 24 A view showing a configuration of a slat according to Configuration Example 2-1 that is an embodiment of the present invention, which is a partial perspective view of an inboard end portion of a slat of a left wing as viewed from the back.

FIG. 24 is a view showing a configuration of a slat 20F according to the present embodiment for describing Configuration Example 2-1, which is a partial perspective view of an inboard end portion of the slat 20F of the left wing as viewed from the back.

The slat 20F according to the present embodiment includes a slat main body 210 and a blade member 61 as a buffering portion that forms its cusp portion 223. The slat main body 210 is similar to that in the first embodiment, so a detailed description thereof will be omitted.

The blade member 61 corresponds to the blade seal BS and is a plate-like member protruding toward the main wing 10 from the lower edge of the leading edge portion 221 of the slat main body 210. As shown by the thin long dashed double-short dashed line in FIG. 24, a typical blade seal BS has a right-angle corner portion 223c on its inboard side (side of the fuselage 1 of the aircraft). Therefore, the above-mentioned corner portion 223c generates relatively strong vortices in the flow toward the cusp portion 223 from the leading edge portion 221 and forms a noise source. In view of this, in the present embodiment, changing the shape of the corner portion on the inboard side of the blade seal BS suppresses generation of strong vortices from the corner portion 223c.

Specifically, the blade member 61 according to the present embodiment has a shape in which the corner portion on the side of the main wing 10 of the aircraft is cut out on its inboard side (side of the fuselage 1 of the aircraft). Regarding the shape in which the corner portion on the inboard side is cut out, it is formed in a curve portion 223r in a smooth curve shape as shown by the solid line in FIG. 24 in the present embodiment. Otherwise, it may be a corner portion 223v in a multi-step shape combining a plurality of corner portions whose interior angles are obtuse angles as shown by the thick long dashed double-short dashed line in FIG. 24 or may be a linear portion 223s with a linear portion 223s as shown by the broken line in the figure.

Furthermore, in the present embodiment, the buffering member 31 described above in the first embodiment is mounted on the inboard end surface of the slat main body 210 as shown in FIG. 24. It corresponds to a combination of Configuration Example 2-1 with Configuration Example 1-1

(first embodiment). In this case, pressure fluctuations around the inboard end portion 230 of the slat main body 210 can be reduced. Therefore, the noise reduction effect can be further enhanced.

Figure 25:
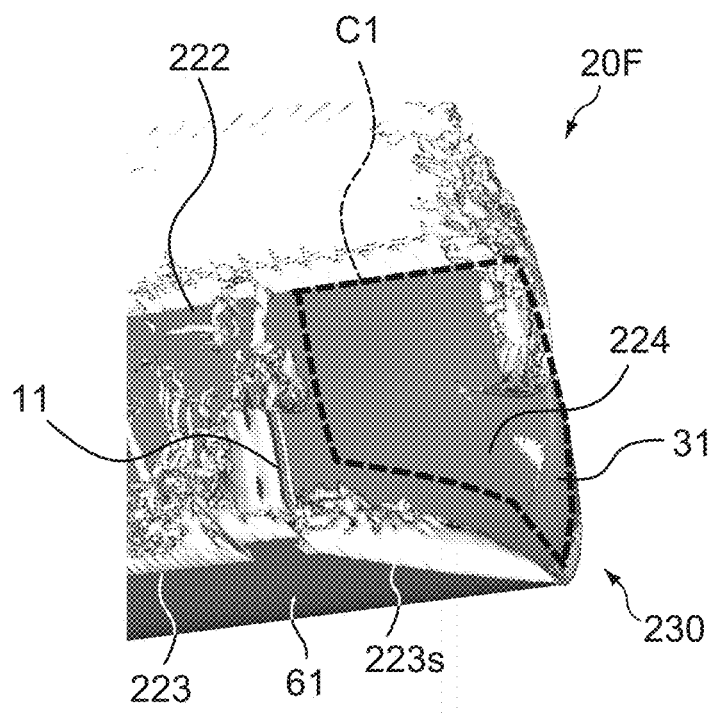
FIG. 25 A numerical simulation result similar to FIG. 8 for describing one effect of the above-mentioned slat.

FIG. 25 shows a simulation result similar to that in FIG. 8, which was conducted on the slat 20F according to this configuration example. Here, an example in which the buffering member 31 according to Configuration Example 1-1 is mounted on the inboard end surface of the slat main body 210 and the end portion of the blade member 61 is formed as the linear portion 223s is shown. As shown in the figure, generation of vortices in the region C1 is effectively suppressed as compared to FIG. 8. It is because of the modifying effect of the buffering member 31. Moreover, as compared to FIG. 8, formation of the linear portion 223s on the blade member 61 can suppress generation of vortices (vortices shown as the arrow C2 and the region C3 in FIG. 8) on the inboard-side end portion of the cusp portion 223 and can also reduce interference between the generated vortices and the slat supporting device 11.

Figure 26:
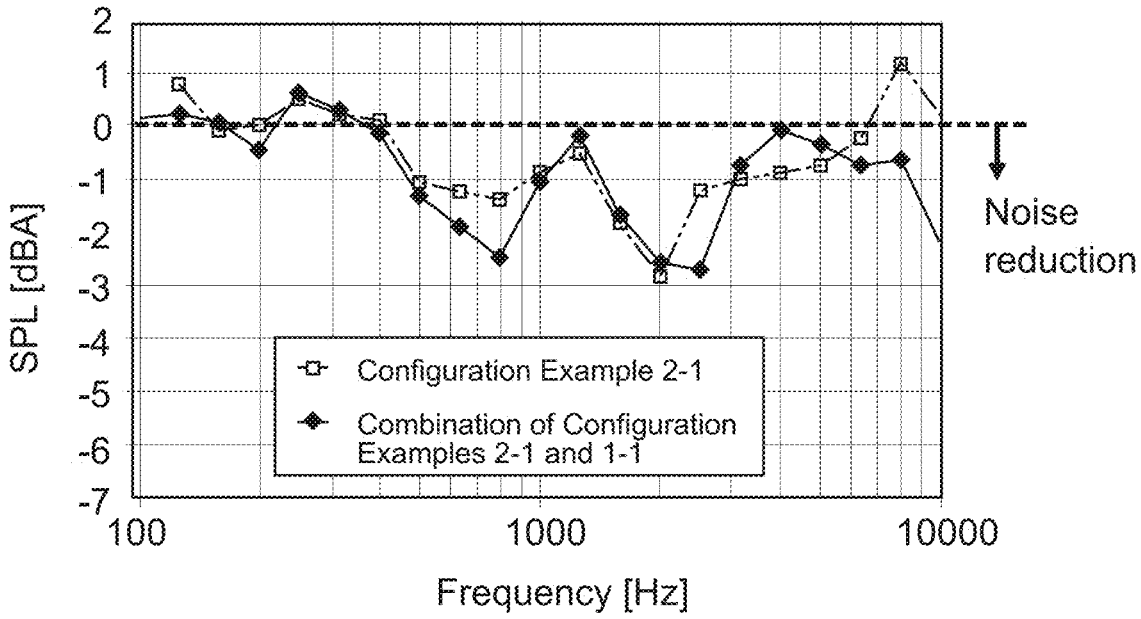
FIG. 26 Wind tunnel testing results of comparing noise reduction effects with/without the buffering member in the slat shown in FIG. 24.

For example, FIG. 26 shows wind tunnel testing results of comparing noise reduction effects with/without the buffering member 31 in the slat 20F according to the present embodiment. FIG. 26 shows frequency characteristics of the noise reduction effect in a directly downward direction of the aircraft of the inboard end portion of the inboard slat after computed in actual scale. In the figure, "Configuration Example 2-1" corresponds to the slat 20F when no buffering member 31 is provided and Combination of Configuration Examples 2-1 and 1-1" corresponds to the slat 20F when the buffering member 31 is provided (see FIG. 24).

It has been found from an experimental result according to Configuration Example 2-1 that modifying the end portion of the blade member 61 to be the linear portion 223s can provide the noise reduction effect in substantially the entire frequency band. Moreover, it has been found that providing it with the buffering member 31 can provide a more significant noise reduction effect in a particular frequency band.

Sixth Embodiment

Configuration Example 2-2

Figure 27:
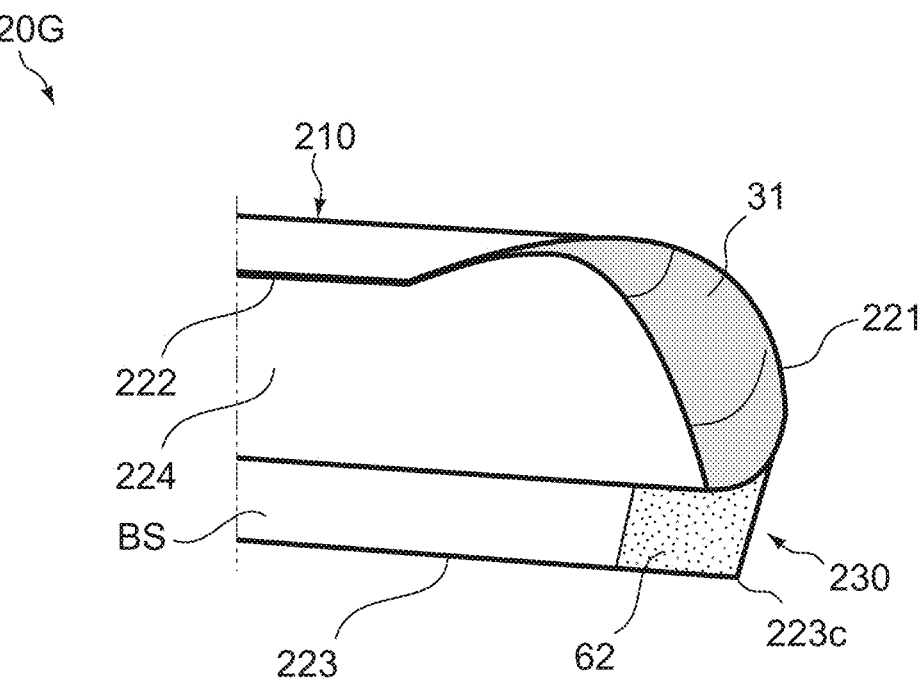
FIG. 27 A view showing a configuration of a slat that is an embodiment of the present invention Configuration Example 2-2, which is a partial perspective view of an inboard end portion of a slat of a left wing as viewed from the back.

FIG. 27 is a view showing a configuration of a slat 20G according to the present embodiment for describing Configuration Example 2-2, which is a partial perspective view of an inboard end portion of the slat 20G of the left wing as viewed from the back.

The slat 20G according to the present embodiment includes a slat main body 210 and a porous layer 62 as a buffering portion formed on the inboard side of its blade seal BS (side of the fuselage 1 of the aircraft). The slat main body 210 is similar to that in the first embodiment, so a detailed description thereof will be omitted.

The porous layer 62 is an end portion on the inboard side of the blade seal BS that forms the cusp portion 223 (end portion on the side of the fuselage 1 of the aircraft. The same applies hereinafter) and is provided on the inner surface of the blade seal BS. The porous layer 62 is made of a porous material having a plurality of holes in communication with one another inside the layer as in the porous layers 51 and 52 described above in the third and fourth embodiments. The porous material is typically made of an inorganic material such as a metal material or a metal oxide material, though not limited thereto. The porous material may be made of a synthetic resin material or a ceramic material, for example. The porous layer 62 may be a plate-like member mounted on the inboard-side surface of the blade seal BS or may be a porous structure surface formed by surface machining on the inboard-side surface of the blade seal BS.

The blade seal BS has a right-angle corner portion 223c on its inboard side (side of the fuselage 1 of the aircraft). Therefore, the above-mentioned corner portion 223c generates relatively strong vortices in the flow toward the cusp portion 223 from the leading edge portion 221 and forms a noise source. In view of this, in the present embodiment, changing the material of the corner portion on the inboard side of the blade seal BS to a porous material suppresses generation of strong vortices from the corner portion 223c.

Furthermore, in the present embodiment, the buffering member 31 described above in the first embodiment is mounted on the inboard end surface of the slat main body 210 as shown in FIG. 27. Accordingly, pressure fluctuations around the inboard end portion 230 of the slat main body 210 can be reduced. Therefore, the noise reduction effect can be further enhanced.

[Characteristic Assessment 2]

Figure 28:
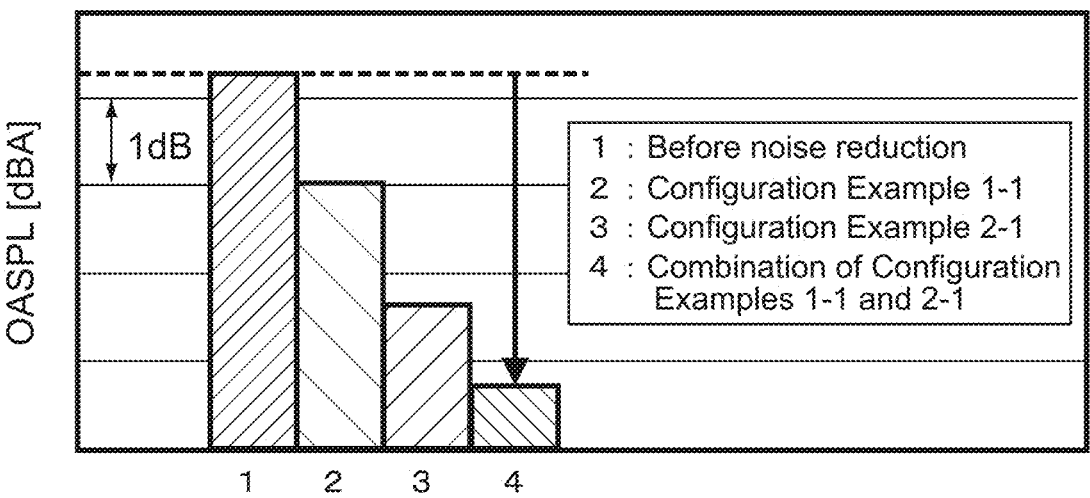
FIG. 28 Wind tunnel testing results of comparing overall sound pressure levels (OASPL) of inboard slat inboard end regions in a directly downward direction of the aircraft as to Configuration Example 1-1, Configuration Example 2-1, and a combination of Configuration Examples 1-1 and 2-1 (FIG. 24) using a slat having a fundamental shape before the noise reduction means is provided as a reference.

FIG. 28 shows wind tunnel testing results of comparing overall sound pressure levels (OASPL) in a directly downward direction of the aircraft as results of checking changes in noise level near the inboard end portion of the inboard slat by noise source localization using a microphone array system as to Configuration Example 1-1, Configuration Example 2-1, and a combination of Configuration Examples 1-1 and 2-1 (FIG. 24) using the slat (corresponding to the slat main body 210) in a fundamental shape before the noise reduction means is provided as a reference. As shown in the figure, each configuration example provided a noise reduction effect of 1 dB or more as compared to the slat in the fundamental shape. Moreover, Configuration Example 2-1 was able to provide a more significant noise reduction effect than Configuration Example 1-1. In addition, combining Configuration Examples 1-1 and 2-1 was able to provide a significant noise reduction effect.

OTHER EMBODIMENTS

Hereinabove, the embodiments of the present invention have been described. However, the present invention is not limited only to such embodiments and various modifications can be made as a matter of course.

Figure 29:
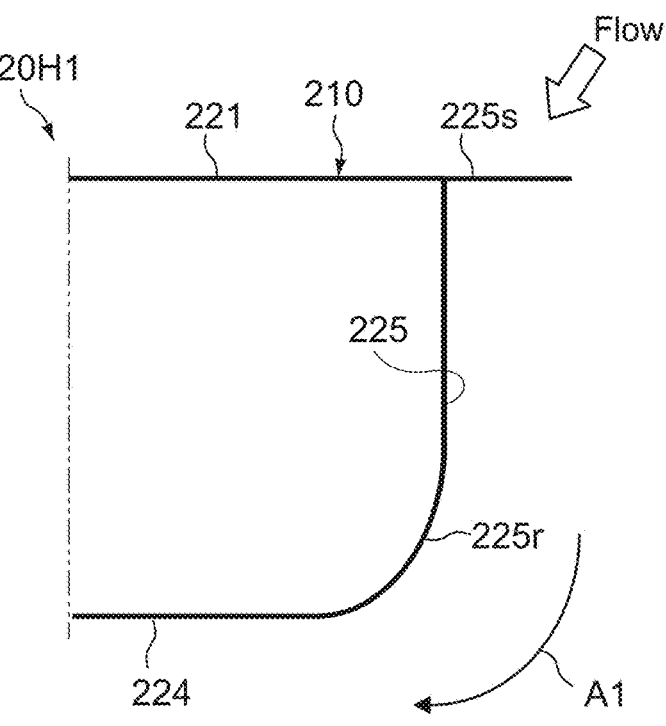
FIG. 29 A schematic configuration diagram of a slat according to another embodiment of the present invention.

For example, in the above-mentioned first embodiment (Configuration Example 1-1), the buffering member 31 is provided on the inboard end surface 225 of the slat main body 210 as the buffering portion. Alternatively, a curved portion 225r obtained by curving the boundary surface between the inboard end surface 225 of the slat main body 210 and the cove portion 224 may be provided, for example, as in a slat 20H1 shown in FIG. 29. Also in this case, the flow on the inboard end portion of the slat 20H1 can be modified to be smooth, pressure fluctuations around such a portion can be reduced, and noise reduction can be achieved.

Figure 30:
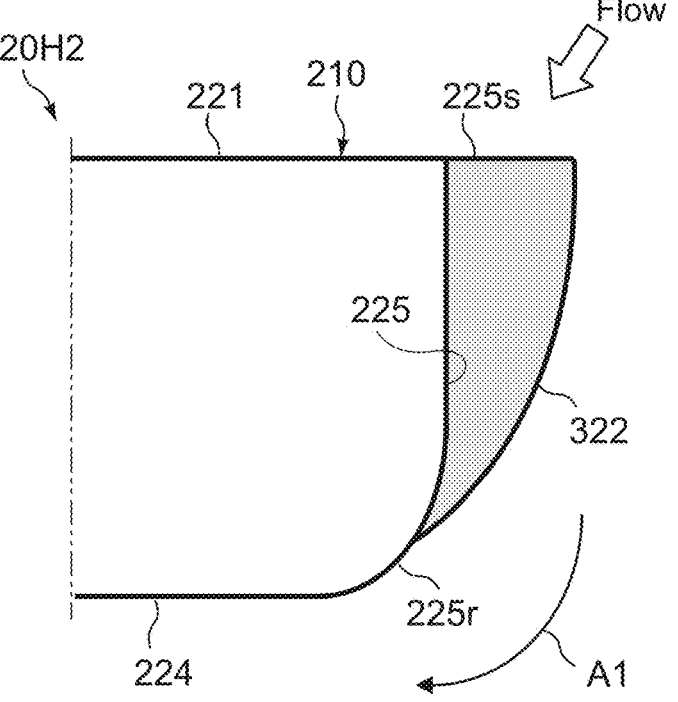
FIG. 30 A schematic configuration diagram of the slat according to another embodiment of the present invention.

Alternatively, as in a slat 20H2 shown in FIG. 30, the curved portion 225r of the inboard end surface 225 may be provided on a downstream side of a curved portion 322 of the buffering member 31. In this case, the buffering member 31 can inhibit airflow separation on the inboard end surface 225. Therefore, the noise reduction effect at the slat inboard end portion can be further enhanced.

Furthermore, in the above-mentioned sixth embodiment (Configuration Example 2-2), the porous layer 62 is mounted on the inner surface of the inboard-side end portion of the blade seal BS that forms the cusp portion 223 as the buffering portion. Alternatively or additionally, the porous layer 62 may be mounted on an outer surface of the inboard-side end portion of the blade seal BS. Providing the porous layer 62 on the outer surface of the inboard-side end portion of the blade seal BS can reduce the velocity of airflow blowing up toward the inner surface from the outer surface of the inboard-side end portion of the blade seal BS and can reduce pressure fluctuations around the inboard-side end portion of the blade seal BS.

Figure 31:
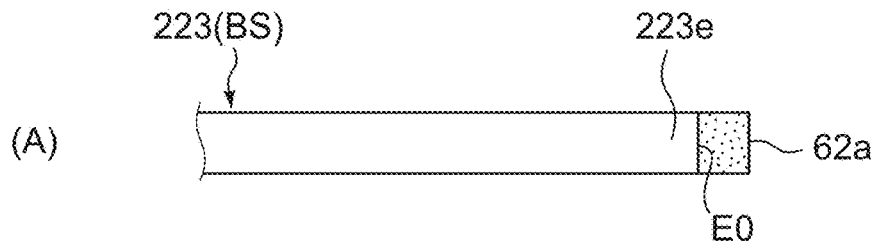
FIG. 31 A schematic configuration diagram of an inboard end portion of a cusp portion for describing other embodiments of the present invention.
Figure 31:
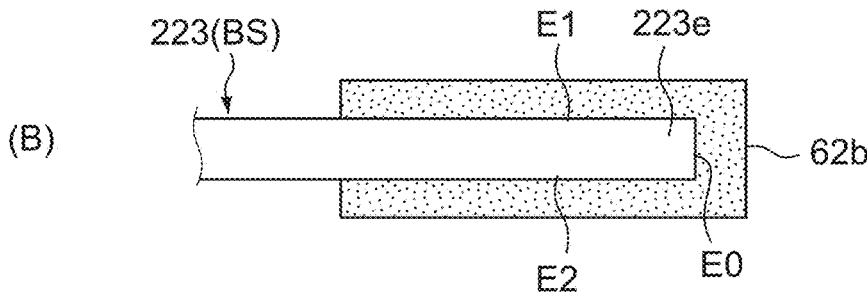
Figure 31:
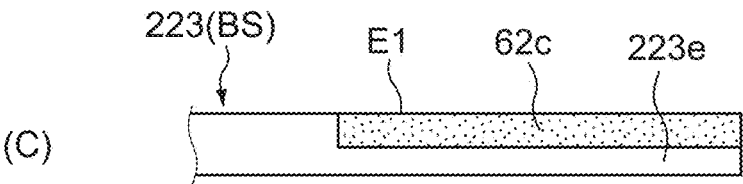
Figure 31:
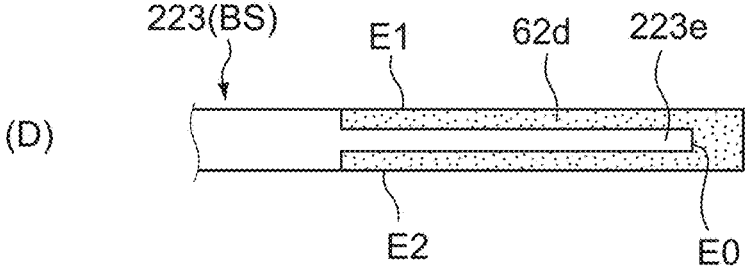
Figure 31:
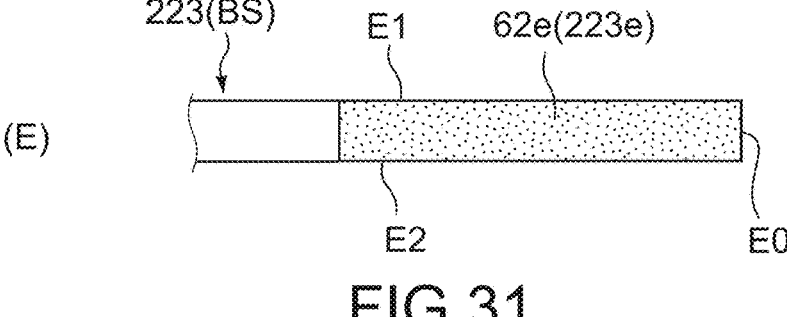

FIG. 31 is a schematic diagram showing another mounting example of the porous layer 62 on the inboard-side end portion of the blade seal BS that forms the cusp portion 223.

(A) of FIG. 31 shows an example in which a porous layer 62a is mounted on an end surface (side surface on the inboard side) E0 of an inboard-side end portion 223e of the cusp portion 223.

(B) of FIG. 31 shows an example in which a porous layer 62b is mounted on an inner surface E1 and an outer surface E2 of an inboard-side end portion 223e, extending over an end surface E0.

(C) of FIG. 31 shows an example in which a porous layer 62c is integrally formed with an inner surface E1 of an inboard end portion 223e. (D) of FIG. 31 shows an example in which a porous layer 62d is integrally formed on an end surface E0, an inner surface E1, and an outer surface E2 of the inboard end portion 223e.

(E) of FIG. 31 shows an example in which the entire inboard end portion 223e is made of a porous material (porous layer 62e) that forms an end surface E0, an inner surface E1, and an outer surface E2.

Those configuration examples can also provide actions and effects similar to those described above.

REFERENCE SIGNS LIST 10 main wing
20, 20A, 20B, 20C, 20D, 20E, 20F, 20G, 20H1, 20H2 slat (leading-edge high-lift device)
31 buffering member
41 fence member
51, 52, 62, 62a, 62b, 62c, 62d, 62e porous layer
61 blade member
100 aircraft wing
221 leading edge portion
222 trailing edge portion
223 cusp portion
223e inboard end portion
224 cove portion
224s inboard-side surface (of cove portion)
225 inboard end surface
230 inboard end portion

We claim:

1. A leading-edge high-lift device that is deployable and retractable from/into a fixed leading edge of a main wing of an aircraft, the leading-edge high-lift device comprising:

a leading edge portion that forms a wing surface and has a streamline shape protruding forward;

an upper surface portion that is continuous with the leading edge portion and that forms a wing surface;

a cove portion that is a concave surface formed between a cusp portion at a lower end of the leading edge portion and a trailing edge portion at a rear end of the upper surface portion, the cove portion facing the fixed leading edge of the main wing;

an inboard end surface that is a flat plane portion surrounded by a fuselage side of the leading edge portion, a fuselage side of the upper surface portion, and a fuselage side of the cove portion;

a skin portion that is continuous with the leading edge portion and the upper surface portion and that projects inboard beyond the inboard end surface; and a buffering portion that is provided between a fuselage side of the skin portion and the fuselage side of the cove portion, the buffering portion having a curved surface that modifies airflow to be smooth airflow flowing toward the cove portion from the skin portion, wherein the cove portion includes:

a first plane portion along a lower edge of the leading edge portion;

a third plane portion along the trailing edge portion; and a second plane portion that couples the first plane portion with the third plane portion, and wherein the curved surface includes:

a flat portion that is continuous with the fuselage side of the skin portion;

a first curve surface portion that smoothly connects the flat portion to the first plane portion; and a second curve surface portion, different from the first curve surface portion, that smoothly connects the flat portion to the second plane portion.

2. The leading-edge high-lift device according to claim 1, wherein the buffering portion includes:

a first outer portion that is held in contact with the inboard end surface; and a second outer portion covering a space between the fuselage side of the skin portion and the fuselage side of the cove portion, the second outer portion including the curved surface.

3. The leading-edge high-lift device according to claim 2, wherein the buffering portion is made of a flexible material that is deformed so as to be capable of entering a gap between the leading-edge high-lift device and the main wing during retraction into the fixed leading edge of the main wing.

4. The leading-edge high-lift device according to claim 2, wherein the second outer portion includes:

the flat portion that is continuous with the fuselage side of the skin portion and is formed as a plane portion parallel to a chord direction of the leading-edge high-lift device; and a curve surface portion formed as the first curve surface portion and the second curve surface portion that continuously connects the flat portion to the cove portion.

5. The leading-edge high-lift device according to claim 1, wherein the buffering portion includes:

the flat portion that is continuous with the fuselage side of the skin portion and is formed as a plane portion parallel to a chord direction of the leading-edge high-lift device; and a curve surface portion formed as the first curve surface portion and the second curve surface portion that continuously connects the flat portion to the cove portion.

* * * * *